US009268488B2

(12) United States Patent
Dong

(10) Patent No.: US 9,268,488 B2
(45) Date of Patent: Feb. 23, 2016

(54) MEMORY LIFE EXTENSION SYSTEM AND METHOD

(71) Applicant: Levven Automation Inc., Edmonton (CA)

(72) Inventor: Yi Dong, Edmonton (CA)

(73) Assignee: Levven Automation Inc., Edmonton (CA)

( * ) Notice: Subject to any disclaimer, the term of this patent is extended or adjusted under 35 U.S.C. 154(b) by 126 days.

(21) Appl. No.: 14/295,927

(22) Filed: Jun. 4, 2014

(65) Prior Publication Data

US 2015/0355850 A1 Dec. 10, 2015

(51) Int. Cl.
G06F 3/06 (2006.01)
G07C 9/00 (2006.01)
G06F 12/02 (2006.01)
G06F 9/30 (2006.01)

(52) U.S. Cl.
CPC ............ *G06F 3/0616* (2013.01); *G06F 3/0659* (2013.01); *G06F 3/0679* (2013.01); *G07C 9/00182* (2013.01); *G06F 9/3004* (2013.01); *G06F 12/0246* (2013.01); *G07C 2009/00253* (2013.01)

(58) Field of Classification Search
CPC .................. G07C 9/00182; G07C 2009/00253; G06F 12/0246; G06F 9/3004
USPC .................................................... 711/103, 155
See application file for complete search history.

(56) References Cited

U.S. PATENT DOCUMENTS 5,615,228 A * 3/1997 Soenen ......................... 375/238
5,832,377 A * 11/1998 Soenen et al. ................ 455/352
6,028,527 A * 2/2000 Soenen et al. ............... 340/5.26

* cited by examiner

*Primary Examiner* — Than Nguyen
(74) *Attorney, Agent, or Firm* — Jenna L. Wilson; Dimock Stratton LLP

(57) ABSTRACT

A memory life extension system and method is provided for managing operation of rewritable memory used to store a monotonically increasing sequence of multiple-byte binary values in a set of one or more memory locations in the rewritable memory. A first value is read in from a set of one or more memory locations. On detection of an instruction to store an incremented value, the incremented value is permuted by applying an encoding, in which a value of a least significant bit changes only on every second increment, to two least significant bits of the incremented value. On overflow of a least significant byte as a result of the increment, a cyclic byte-wise shift is applied to the incremented value. The permuted incremented value is then stored in the one or more memory locations.

15 Claims, 16 Drawing Sheets

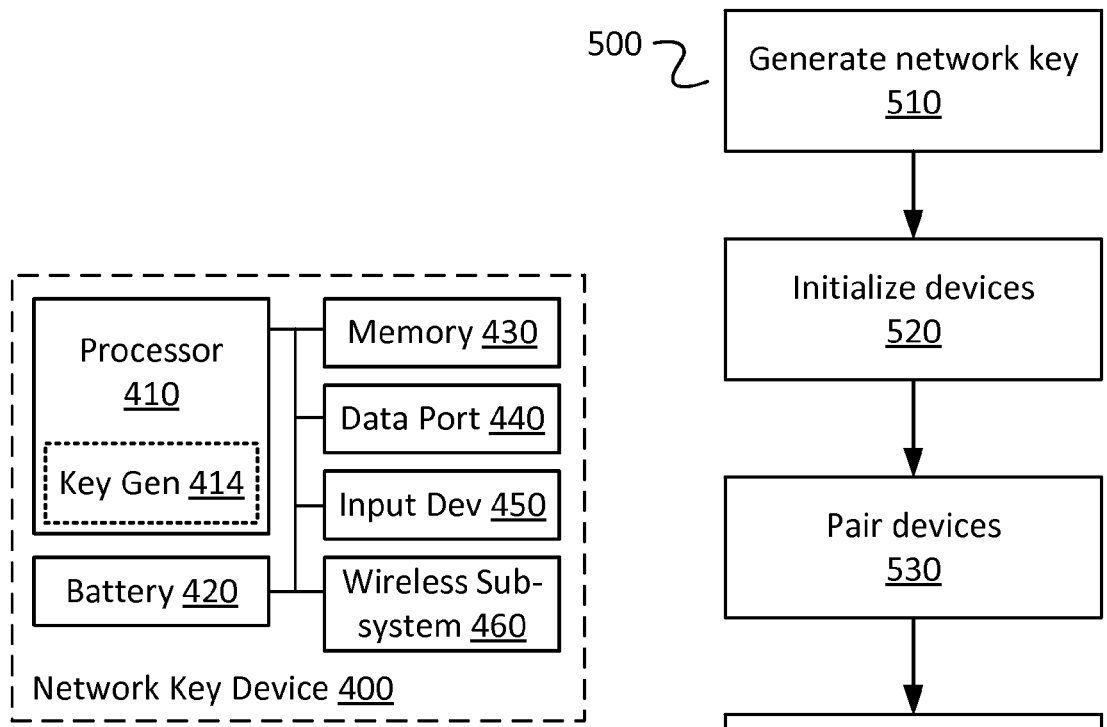

MEMORY LIFE EXTENSION SYSTEM AND METHOD

TECHNICAL FIELD

The present disclosure relates to a system and method of memory life extension for use when the memory is used to store an increasing sequence of values.

TECHNICAL BACKGROUND

Some wireless systems involving the transmission of commands between sending and receiving devices may be vulnerable to attack by malicious third parties who attempt to spoof one of the devices and send commands from an untrusted or insecure device. Several techniques, such as encryption, have been developed to mitigate the risk of third-party attacks. However, while these techniques improve security, they may also tax the wireless system's processing, power, or memory resources.

In particular, security solutions that require the transmission and storage of changing values between devices may result in a significant increase in write-erase cycles undertaken in the memory of the participating devices. While the lifetime of some memory components may run to the millions of cycles, including such durable memory in a relatively low-cost device may increase the manufacturing cost of the device beyond acceptable limits.

BRIEF DESCRIPTION OF THE DRAWINGS

The accompanying drawings illustrate, by way of example only, embodiments of the present disclosure. In the accompanying drawings, like reference numerals describe similar items throughout the various figures.

FIG. 4 is a schematic of an example of a network key device for use with the wireless light switch system of FIG. 1.

FIG. 5 is a flowchart of an example overview method for use with the wireless light switch system of FIG. 1.

DETAILED DESCRIPTION OF THE INVENTION

Figure 1:
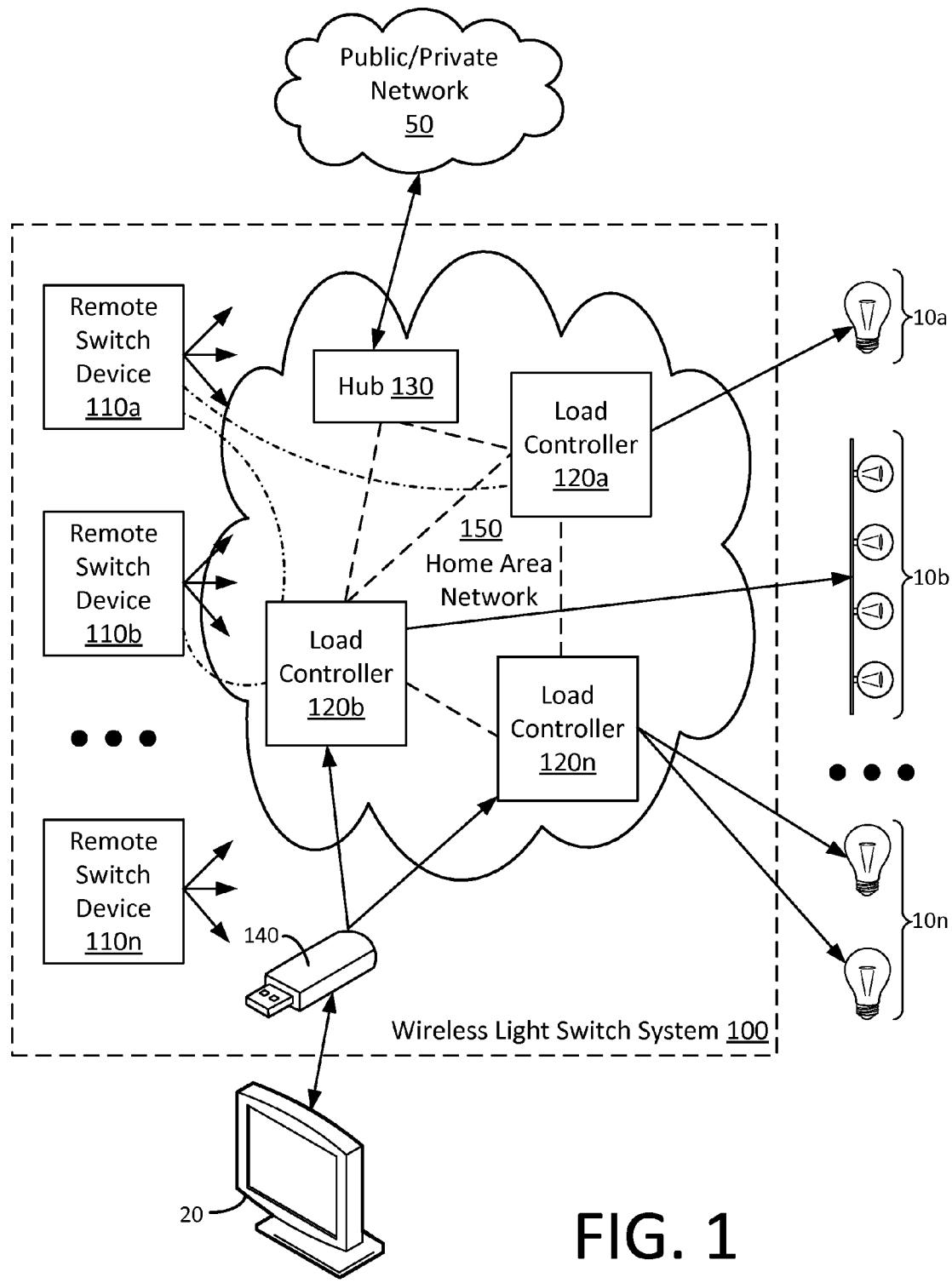
FIG. 1 is a schematic of an example network topology for a wireless light switch system operating over a home area network.

There is accordingly provided a method of managing operation of rewritable memory, comprising: reading in a first value from the set of one or more memory locations; on detection of an instruction to store an incremented value: permuting the incremented value by, in combination: applying an encoding, in which a value of a least significant bit changes only on every second increment, to two least significant bits of the incremented value; and on overflow of a least significant byte as a result of the increment, applying a cyclic byte-wise shift to the incremented value; and storing the permuted incremented value in the one or more memory locations.

In one aspect of this method, wherein the encoding applied to the least significant two bits comprises an encoding of a'1=a1 and a'0=a1 ⊗ a0, wherein a0 is an initial value of the least significant bit, a'0 is an encoded value of the least significant bit, a1 is an initial value of a second-least significant bit, and a'1 is an encoded value of the second-least significant bit.

In another aspect, the set of one or more memory locations comprises a plurality of memory locations, and the cyclic byte-wise shift comprises shifting a memory location allocated to a byte of the first value to a next byte of the incremented value.

There is also provided a method of managing operation of rewritable memory used to store a sequence of binary values, the method comprising: defining an allocation of each one of a plurality of memory blocks in the rewritable memory to a corresponding byte position of a multiple-byte value; storing a first multiple-byte value in the memory blocks corresponding to the plurality of memory addresses according to the allocation; reading in the first value from the memory blocks; incrementing the first value to provide an incremented value; encoding two least significant bits of the incremented value according to the encoding of a'1=a1 and a'0=a1 ⊗ a0, wherein a0 is an initial value of the least significant bit, a'0 is an encoded value of the least significant bit, a1 is an initial value of a second-least significant bit, and a'1 is an encoded value of the second-least significant bit; when the incrementing of the first value does not result in an overflow of a least significant byte, storing the incremented value in the memory blocks according to the allocation; when the incrementing of the first value results in an overflow of a least significant byte, altering the allocation by cyclically shifting the allocation of the plurality of memory blocks to the corresponding byte positions, and storing the incremented value in the memory blocks according to the allocation as altered.

In one aspect, storing the incremented value comprises rewriting only those memory blocks corresponding to bytes of the incremented value that are changed.

The method may further comprise maintaining a mapping of the allocation of the plurality of memory blocks to the corresponding byte positions.

In another aspect, only the least significant bit of the first value is incremented.

There is also provided a method of managing operation of rewritable memory used to store an increment of a stored value, the stored value being represented by multiple bytes, the multiple bytes being stored in a defined set of blocks of the rewritable memory according to a defined byte order, the method comprising: detecting an instruction to store an incremented value in place of the stored value; permuting two least significant bits of the incremented value according to the encoding of a'1=a1 and a'0=a1 $\otimes$ a0, wherein a0 is an initial value of the least significant bit, a'0 is an encoded value of the least significant bit, a1 is an initial value of a second-least significant bit, and a'1 is an encoded value of the second-least significant bit; upon determining that the incremented value results in an overflow of a least significant byte as compared to the stored value, permuting the byte order according to a cyclic byte-wise shift, and storing the incremented value as incremented according to the permuted byte order.

In these methods, the rewritable memory may comprise EEPROM. Further, the method may be implemented in where the first value and the incremented value comprise values in a rolling code algorithm.

There is also provided an electronic device comprising memory and a processor configured to implement the foregoing methods and variants.

The invention is presented in the context of a wireless light switch system employing a rolling code or a similarly monotonically increasing value that is stored by one or more devices in the system. It will be appreciated, however, that the particular memory life extension solution provided herein need not be limited to this implementation at all, but may be used in any context where the benefits of the invention are desired. Accordingly, it will be understood by those skilled in the art that the particular embodiments and examples are not to be taken as limiting the scope of the invention.

The embodiments described and depicted herein provide a wireless light switch system comprising one or more remote switch devices and corresponding load controllers capable of many-to-many association for flexible control of light fixtures over a home area network. In one implementation, the remote switch devices are independently-powered rocker switch-type devices having a low profile and that are capable of being installed on a flat surface using conventional, commercially available rocker-switch wall plates such as Leviton Decora® brand wall plates. The low profile of the remote switch devices permits them to be mounted behind a conventional wall plate without the need for an electrical box or cutout to accommodate the remote switch device, thereby permitting the installer to place the remote switch device wherever desired. The corresponding load controllers are sized so that they can be contained inside conventional junction boxes (e.g., octagonal electrical boxes) with their antennas extending through a knockout, thereby permitting the load controllers to be substantially concealed, and even be mounted inside metal junction boxes that would otherwise interfere with RF reception.

Pairing between remote switch devices and load controllers may be accomplished in some embodiments without requiring manual operation of the load controller. Security may be provided for the home area network using encryption and a rolling (hopping) code. To reduce implementation cost of the rolling code, a wear-levelling technique may be applied to the memory components of the system.

In accordance with an embodiment, FIG. 1 illustrates an example network topology for a wireless light switch system 100 for use in a building, whether for residential, commercial, or other use. The wireless light switch system 100 includes one or more remote switch devices 110a-110n (generally referred to herein as remote switch device or devices 110), and one or more corresponding load controllers 120a-120n (generally referred to as load controller or load controllers 120), the latter configurable to participate in a wireless home area network 150. Each of the remote switch devices 110 and load controllers 120 comprises transmitters, receivers, and/or transceivers suitable for operation with a home area network 150 or for communication with other devices 120, 110 in the system 100, as discussed below.

Each remote switch device 110 is paired with, and can be operated to control, one or more corresponding load controllers 120 over the home area network 150. Each load controller 120 in turn controls one or more lighting devices, represented schematically as loads 10a-10n. In this embodiment, each load controller 120 is wired to its corresponding load or loads 10a-10n; thus, in the example of FIG. 1, controller 120a is wired to a single light fixture 10a comprising a single light source; controller 120b is wired to a single light fixture 10b comprising multiple light sources; and controller 120n is wired to multiple light fixtures 10n. Furthermore, any load controller 120 may be paired with one or more corresponding remote switch devices 110. In FIG. 1, stippled lines between illustrate example pairings of remote switch device 110a with multiple load controllers 120a, 120b, and remote switch device 110b with load controller 120b. The second load controller 120b is thus controllable using commands issued from either the remote switch device 110a or 110b. The number of devices to which each load controller 120 or remote switch device 110 can be paired may be subject only to programmed limits configured for each of the remote switch devices 110 and load controllers 120. As discussed in further detail below, the pairing can be an effectively "one way" pairing, where each load controller 120 is configured to whitelist one or more select remote switch devices 110 and thereafter respond only to command signals broadcast by those whitelisted remote switch devices 110. In other embodiments, load controllers 120 and remote switch devices 110 are mutually paired, with each device 110, 120 storing pairing information for its paired devices 120, 110 so that remote switch devices 110 can address command signals to specific load controllers 120.

While each load controller 120 may be capable of receiving control signals directly from their paired remote switch device(s) 110, in some cases the load controllers 120 may be configured as nodes in a home area network 150 to potentially extend the reach of a transmitter in a given remote switch device 110 and/or improve reliability of the system 100 in the event a direct transmission route between a remote switch device 110 and a paired load controller 120 is not possible. The home area network 150 is a wireless network operating using any frequency and protocol suitable for communication and control of appliances in a building automation context. In this particular example, the network 150 operates over a sub-1 GHz band (e.g., 315 or 915 MHz) in compliance with applicable regulations. In one embodiment, transmissions between the remote switch devices 110 and the load controllers 120 take place over a 915 MHz band, which in some current environments may be preferred over other bands (e.g., 2.4

GHz) due to lower likelihood of signal collision and greater signal penetration in a typical furnished building structure. However, those skilled in the art will appreciate that a most suitable wireless communication standard for use with the wireless light switch system 100 is one that provides sufficiently reliable data delivery at an acceptable cost in resources and power consumption.

The home area network 150 may operate in a mesh or star configuration. In FIG. 1, dashed lines indicate example transmission routes between load controllers 120 and the optional hub 130, discussed below, in a mesh network. In some cases, for instance, the network 150 may operate in compliance with the ZigBee® 1.0 or later specification, or alternatively in compliance with the Z-Wave® wireless communications protocol. In other cases a different topology or standard may be selected. In this disclosure the term "home area network" is merely intended to distinguish from other local wireless networks, such as personal area networks and the like; it will be appreciated by those skilled in the art that the term is not intended to restrict the embodiments described herein to residential applications.

The wireless light switch system 100 can include an optional hub device 130 that operates as a gateway between the home area network 150 and the Internet or other suitable public or private network 50 to permit communication with components of the system 100 with remote devices (not shown). Remote devices can include servers or other communication equipment provided by a utility (e.g., an electricity distribution company), or user communication devices, such as a personal computer, laptop, tablet, smartphone, or similar device. In the former case, the hub 130 may be configured as a smart energy portal that collects utility usage data from connected smart devices on the wireless light switch system 100, which could include load controllers 120, then transmits this usage data to the utility, or manages the operation of devices on the home area network 150. In the latter case, the hub 130 may be configured to collect status information from load controllers 120 and transmit the status information to the user communication device, and to receive operation commands (e.g., ON/OFF) from the user communication device for forwarding to one or more load controllers 120. The hub device 130 may be a distinct computing device dedicated to the wireless light switch system 100, or it can be integrated in another appliance or fixture.

It can be seen in FIG. 1 that the remote switch devices 110 need not necessarily operate as nodes in the home area network 150. Rather, they operate independently of the network, and simply broadcast messages to any receiving devices within range. In such an embodiment, the remote switch devices 110 do not need to be equipped with RF receivers or transceivers, but merely require an RF transmitter, thus reducing the cost of manufacture and potentially reducing power consumption.

In some example wireless light switch systems 100, a network key device 140 is also included. In FIG. 1, the network key device 140 is depicted schematically as a USB key comprising an embedded transmitter or transceiver (not shown), which is capable of communicating wirelessly over the home area network 150 with each of the remote switch devices 110, load controllers 120, and hub 130. The network key device 140 is used to generate a network or security key for configuring devices 110, 120, and 130 on the home area network 150, and/or to optionally transmit instructions received from a configuration computer 20 to load controllers 120 to define traffic routes in the home area network 150. It will be appreciated that if the network key device 140 is used in the system 100, it need not take the example form illustrated in FIG. 1 provided it is configured to implement the functions described herein.

Figure 2:
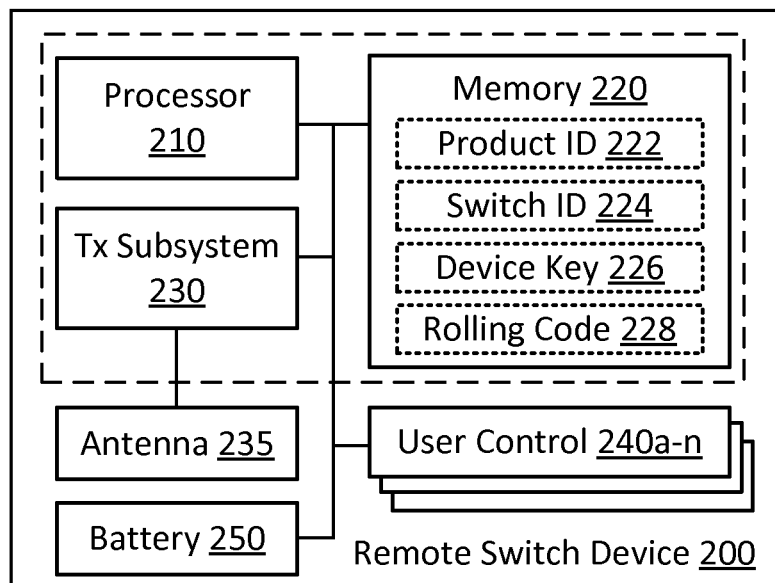
FIG. 2 is a schematic of an example of a remote switch device for use in the wireless light switch system of FIG. 1.
Figure 3:
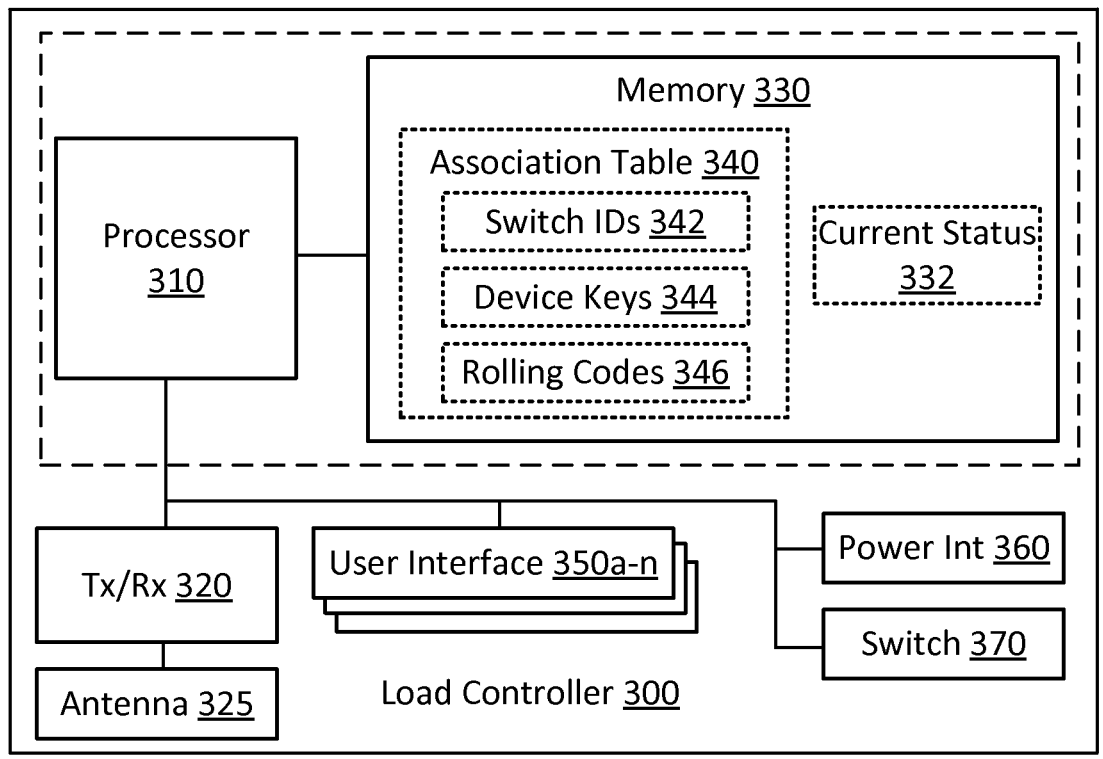
FIG. 3 is a schematic of an example of a load controller for use in the wireless light switch system of FIG. 1.

FIGS. 2 to 4 illustrate certain components of an example remote switch device 200, load controller 300, and network key device 400 for use in the wireless light switch system 100 of FIG. 1. It will be appreciated by those skilled in the art that the depicted embodiments represent only examples, and that the devices 200, 300, and 400 may omit one or more of the defined components, include additional components, or substitute other components for those described herein. In particular, those skilled in the art will appreciate that other components typically included to accomplish functions not explicitly detailed herein, such as circuit components, oscillators, and the like, may have been omitted to simply the schematics and accompanying description; however, the selection and inclusion of such components will be known to the skilled worker.

The devices 200, 300, 400 may also be configured to implement different or additional functions, and may therefore include additional components not mentioned. For instance, it will be noted that the wireless light switch system 100 and the operations described herein are generally directed to simple control (ON/OFF) of a light fixture. However, it will be appreciated by those skilled in the art that the devices, methods and system described herein can be extended to and adapted for other control functions and suitable loads. For instance, a remote switch device 110 may be configured to transmit dimming commands to a load controller 120 to control the lighting level of corresponding light fixtures. In that case, the devices 110, 200 and the load controllers 120, 300 may therefore be provided with different electrical controls in order to accomplish the dimming function. The remote switch device 110 may instead comprise a sensor device for detecting a state of another fixture or an entrance (e.g., a contact or contactless sensor detecting whether a door or window is opened or closed), or detecting environmental conditions (e.g. temperature, moisture, ambient light level), which may be used to control operation of an electrically-controlled fixture or appliance, such as a light fixture, entertainment system, humidifier, air conditioner, and the like. The sensor device would then transmit state or condition data to a load controller associated with the fixture or appliance for action, or else will process the detected state or condition to identify a command to be sent to the load controller. Such modifications and variations are within the knowledge of the person of ordinary skill in the art; the examples provided herein are not intended to be limiting.

An example schematic remote switch device 200 is shown in FIG. 2. The device 200 includes a microprocessor 210 in communication with non-volatile memory 220 such as electrically erasable programmable read-only memory (EEPROM), an RF transmitter subsystem 230 and antenna 235, and one or more user controls 240*a*-240*n*. In these examples, it is contemplated that the remote switch device 200 will be provided with an internal power source such as battery 250, rather than wired to the building's main power supply. In a simple embodiment, where operation of the remote switch device 200 does not require the device 200 to receive and process RF signals, an RF transmitter as indicated in FIG. 2 is provided instead of a combination transmitter-receiver (transceiver) subsystem. In other embodiments, where the remote switch device 200 is required to receive and process RF signals, a receiver component would be included. However, to reduce power consumption, receiving operations can be restricted to certain operational states of the device 200 (e.g., during a pairing state) so as to reduce power consumption.

The memory 220 stores code (not shown) executable by the processor 210 to implement various switch functions described herein. The memory 220 also stores control data such as a product identifier 222, switch identifier 224, device key 226, and rolling code value 228. Some of this control data is used for security purposes, and as such it will be appreciated that it may be optional or may be varied, should the security features described herein not be implemented. The particular format of the control data (bit size, etc.) may vary according to the particular implementation.

The product identifier 222 is a code generated and stored in the memory 220 at the time of manufacture or before installation, and may be the same for all remote switch devices 110, or the same for groups of remote switch devices 110. The switch identifier 224 is a value uniquely or quasi-uniquely assigned to the remote switch device 110. The device key 226 is a unique or quasi-unique value generated and stored in memory 220 at the time of initialization or pairing of the switch 200. As explained below, the device key 226, if used, is provided to the load controller 300 during pairing and is used to encrypt data sent to the load controller 300.

The memory 220 may be integrated in the processor 210. The processor 210, memory 220, and transmitter subsystem 230 may optionally be provided in a single system on chip (SoC) package, as denoted by the dashed line in FIG. 2. If additional data storage capacity is required, additional non-volatile memory (e.g., EEPROM or flash memory) external to the processor and/or SoC can be included.

The remote switch device 200 includes one or more user controls 240a-240n for receiving operator instructions from a user. In the context of light fixtures, common user controls for simple ON/OFF control include electromechanical devices such as a physical toggle, push button, or rocker switch. Actuation of a physical component triggers a corresponding signal via a user control interface to the processor 210, which initiates transmission of a command to one or more load controllers via the wireless subsystem 230 and antenna 235. Other user controls, such as dials, sliders, and the like may also be employed, particularly when more complex control (e.g., dimming) is desired.

FIG. 3 illustrates an example schematic for a load controller 300. The load controller 300 includes a control circuit including a microprocessor 310 in communication with non-volatile memory 330, a receiver or transceiver subsystem 320 with antenna 325, user interfaces 350a-350n, an AC power interface 360 for connecting to the building electrical system, and a switch or relay system 370 controlling current to a load, such as one of the light fixtures 10a-10n. The user interfaces 350a-350n can include any suitable input or output components, such as switches, light emitting devices (LEDs), speakers, and the like, for receiving user commands and providing user notifications. The memory 330 may be integrated in the processor 310 as indicated by the dashed line in FIG. 3, or else the processor 310, receiver/transceiver subsystem 320, and memory 330 may be provided in a SoC as with the remote switch device 200. In a simpler embodiment, the RF functions of the load controller 300 are restricted to receiving signals from other devices, so a transmitter function is not required. In other cases, for instance where the load controllers 300 operate as nodes in a mesh network and may be required to forward messages to other devices in a home area network 150, a transmitter is required and included in the load controller 300.

The memory 330, which again may comprise EEPROM, stores control data for the load controller 300 including current status information 332 and an association table 340 storing data for paired remote switch devices 200. The current status information 332 may be a set of bits or a byte indicating a current status of the associated load (e.g., whether the load is currently ON or OFF, or a current dimming level), based on detected current or a last instruction received from a paired device 200. This current status information 332, being stored in non-volatile memory, will be retained even after a mains power outage and can be referenced by the load controller upon restoration of power so that the load can be returned to its expected state. The association table 340 includes, for each remote switch device 200 with which the load controller 300 is paired, a switch identifier 342, a device key 344, and a rolling code 346. The data stored in the association table 340 thus mirrors select data stored in the paired remote switch device(s) 200, although as explained below, the rolling code 228 and 346 may not be synchronized at all times. Also, as further explained below, the device key 344 and the rolling code 346 are used to provide a level of security to the wireless light switch system 100. However, it is sufficient, albeit less secure, for the association table 340 to store only the switch identifiers 342 for the paired remote switch devices 200.

The network key device 400, shown in FIG. 4, includes a processor 410, a power supply (here shown as battery 420), non-volatile memory 430, an optional data port 440 and user input mechanism (such as a button) 450, and a wireless subsystem 460, which may comprise a RF transmitter or transceiver and antenna. In a simple home area network implementation, the network key device 400 is used to generate a network key at the time of initialization of the various devices 110, 120, 130 on the home area network 150. The network key may be used in particular where there is a risk that the wireless coverage of adjacent home area networks may overlap. The network key device 400 therefore includes a key generation module 414, which may be implemented in the processor, or a separate module stored in memory 430 executable by the processor 410. The key generation module may comprise a pseudorandom number generator, but may also implement any suitable algorithm or methodology known in the art. Once the key is generated by the key generation module 414, it is stored in the memory 430 and transmitted to each device participating in the network 150 using the wireless subsystem, as discussed below. In some embodiments, the network key device 400 may store the key, once generated, in encrypted form.

In other examples, the network key device 400 may be used to configure routing between various devices 110, 120 in the home area network 150. In that case, the network key device 400 is adapted to communicate with the configuration computer 20 to receive data defining routing instructions for the various paired remote switch devices and load controllers. The network key device 400 is then used to transmit the routing instructions to each device. Communication with the configuration computer 20 may be accomplished wirelessly if the wireless subsystem 460 includes a receiver component, or alternatively by a fixed connection (such as the USB connection illustrated in FIG. 1).

The network key device 400 is preferably portable so that it can be brought to already-installed remote switch devices 110 and load controllers 120, should they require configuration or reconfiguration. Thus, in a further embodiment, the network key device 400 can be embodied in a portable user mobile device such as a smartphone or tablet adapted for wireless communication using the protocol employed by the home area network 150. In that case, the mobile device may also operate as the configuration computer 20, eliminating the need for a separate device. The network key device 400 may also be implemented in a remote control device configured to transmit operation commands to load controllers 120 in the home are network 150.

Turning now to FIG. 5, a general overview method 500 for installation, configuration, and operation of the wireless light switch system 100 is illustrated. A network key device 140 is used at 510 to generate a network key for provision to various devices 110, 120, 130. At 520, the devices 110, 120, 130 are initialized. Initialization can include initial configuration of the wireless transceivers and/or other components of each device in accordance with preset parameters encoded in the memory of the device 110, 120, 130 when the devices are booted on power up. In the case where the network key generated at 510 is applied, the initialization includes receipt and storage of the network key from the network key device 140. Once a remote switch device 110 and a load controller 120 have been initialized, they may then be associated or paired at 530. If the network key device 140 is not used in the wireless light switch system 100, then the key may be generated and stored in each participating device 110, 120, 130 using another technique known in the art, which can include pre-loading the network key for a given set of devices 110, 120, 130.

Subsequent to pairing, at 540, the various components of the wireless light switch system are installed and connected, as necessary, to the building power supply and light fixtures. Accordingly, one or more remote switch devices 110 are mounted on walls or other structural components of the building; one or more load controllers 120 are mounted adjacent or proximate to target light fixtures 10a-10n as desired, and where possible, inside the junction or electrical box for each light fixture, as will be described below; and the hub 130 is connected to the Internet or other public/private network 50.

After devices 110, 120 have been paired and installed, at 550 either the remote switch devices 110 or the hub 130 may be used to transmit control commands to the load controllers 120. The associations between the various remote switch devices 110 and 120 can also be managed at 560, whether by removing a paired device, adding a new paired load controller 120 to a remote switch device 110, adding a new paired remote switch device 110 to a load controller 120, and so on.

It will be understood by those skilled in the art that the steps depicted in the overview method 500 need not be followed in exactly the order set out in FIG. 5. For instance, devices 110, 120, 130 may be installed prior to pairing or even initialization, although may be more convenient to complete initialization and pairing prior to installation while all devices are within the user's reach. In particular, when the pairing process requires user input at the load controller 120, it would be preferable to complete initialization and pairing for the load controllers 120 prior to installation, as the user controls on a load controller may be effectively inaccessible once the load controller is installed in an electrical box. Pairings may be managed 560 at any time once at least one pair of devices has been associated with each other.

Figure 6:
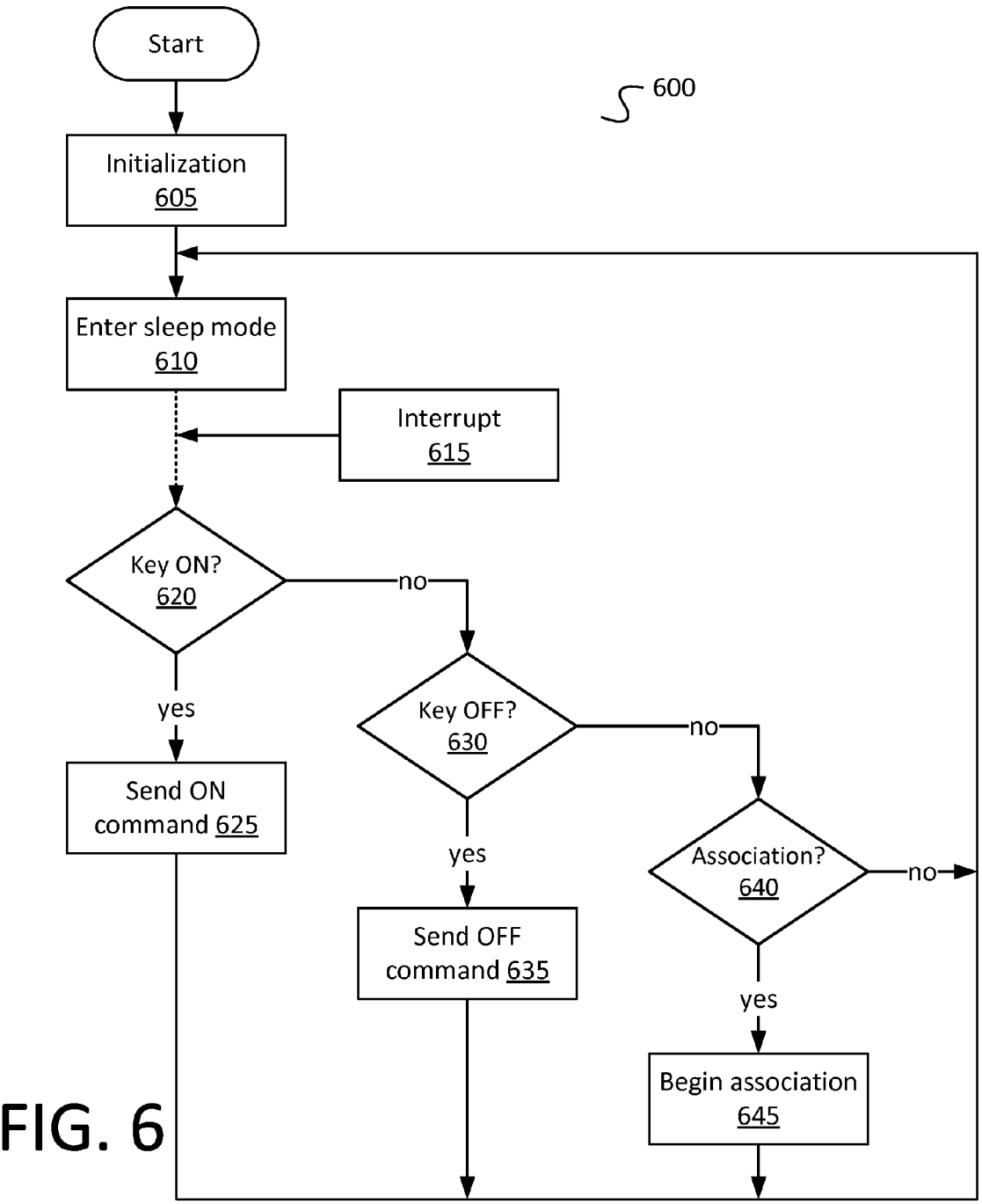
FIG. 6 is a flowchart of an example control flow for the remote switch device of FIG. 2.

FIG. 6 depicts an example of the general workflow or control flow 600 for a remote switch device 110. At 605, the remote switch device 110 is powered on and initialized. Initialization may take place on reset, which could occur each time the device is powered up after a loss of power. As discussed below, the initialization can include receipt of a network key from a network key device 140. This may be carried out wirelessly while the device is in an initialization state. To reduce battery consumption, once the remote switch device 110 has completed initialization, the RF receiver component in the remote switch device 110 may be completely or partially disabled unless pairing is initiated by the remote switch device 110.

At 610, after a timeout period following initialization, the remote switch device 110 enters a sleep mode while it awaits a user input, in order to conserve power. At 615, an interrupt signal is detected. This interrupt may be triggered by a user action, such as actuation of a physical button, switch, or other control on the remote switch device 110. The primary source of an interrupt signal at the remote switch device 110 is expected to be user actuation of the switch in order to control a light fixture; thus, as noted above, to preserve battery life the device 110 does not respond to received RF signals unless it is implementing an initialization or pairing procedure.

At 620, the processor of the remote switch device 110 determines whether the interrupt indicates an ON command (for example, if the remote switch device 110 comprised a physical rocker or toggle switch, detection that the physical switch was moved to the "ON" position); if so, at 625 an ON command is transmitted over the home area network 150 to be received by a paired load controller or controllers 120. If the signal does not indicate an ON command, it is then determined at 630 whether the interrupt indicates an OFF command.

If an OFF command was received, at 635 the remote switch device 110 transmits an OFF command over the home area network to be received by the paired controller(s) 120. If the command is not an OFF command, at 640 it is determined whether the command was an association or pairing command. If so, the association or pairing process is initiated at the remote switch device 110 at 645. Upon responding to the interrupt by transmitting a command or beginning the association process, or upon determining that the interrupt does not correspond to a known command, the remote switch device 110 returns to sleep mode 610, optionally after a predetermined timeout period.

Figure 7:
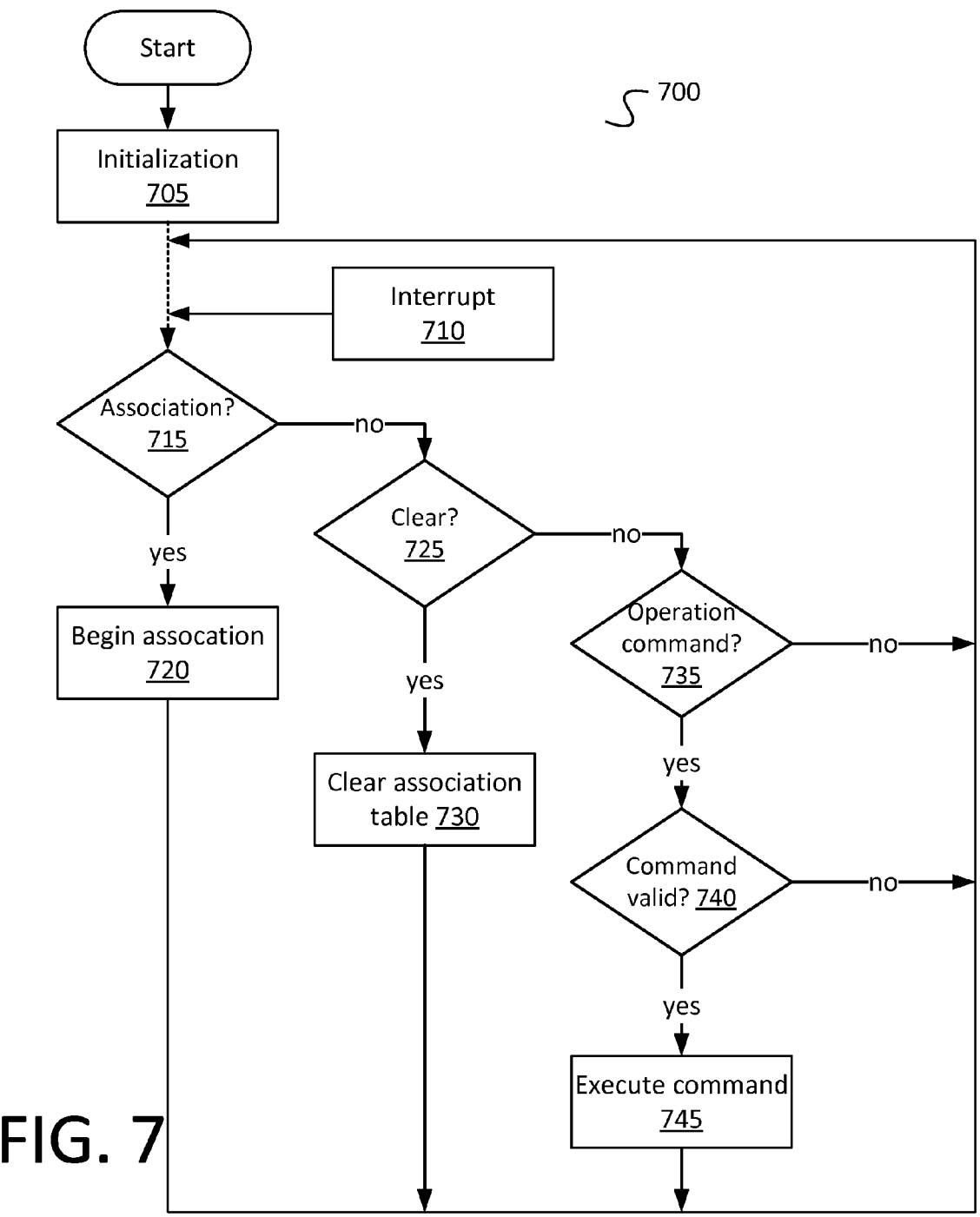
FIG. 7 is a flowchart of an example control flow for the load controller of FIG. 3.

FIG. 7 depicts an example of the general workflow 700 for a load controller 120. At 705, the load controller 120 is powered on and initialized. As with the remote switch device 110, initialization may occur either on initial power-up or on reset. At 710, an interrupt signal is received. In the case of the load controller 120, the interrupt may arise from a user actuation of a user control on the load controller 120 (e.g., a button or switch actuation), or from receipt of an RF message. At 715, the processor of the load controller 120 determines whether the interrupt indicates a message initiating an association or pairing process with a remote switch device 110. If so, the association process, described in further detail below, starts at 720. If not, the load controller 110 determines at 725 whether the received interrupt indicates a CLEAR command. If so, the load controller clears its stored association table at 730 to remove all pairings. When the association table is cleared, the load controller 120 is no longer paired with any remote switch devices 110; however, it may still communicate with the network key device 140 or hub 130, if available.

If a CLEAR command was not received, then at 735 the load controller 120 determines whether a command to carry out an operation, such as ON/OFF, was received. If so, the load controller 120 determines whether the command is valid at 740 (including determining whether the load controller is paired with the remote switch device transmitting the command, if the command was transmitted by a remote switch device). If the command is valid, then the command is executed at 745.

Figure 8:
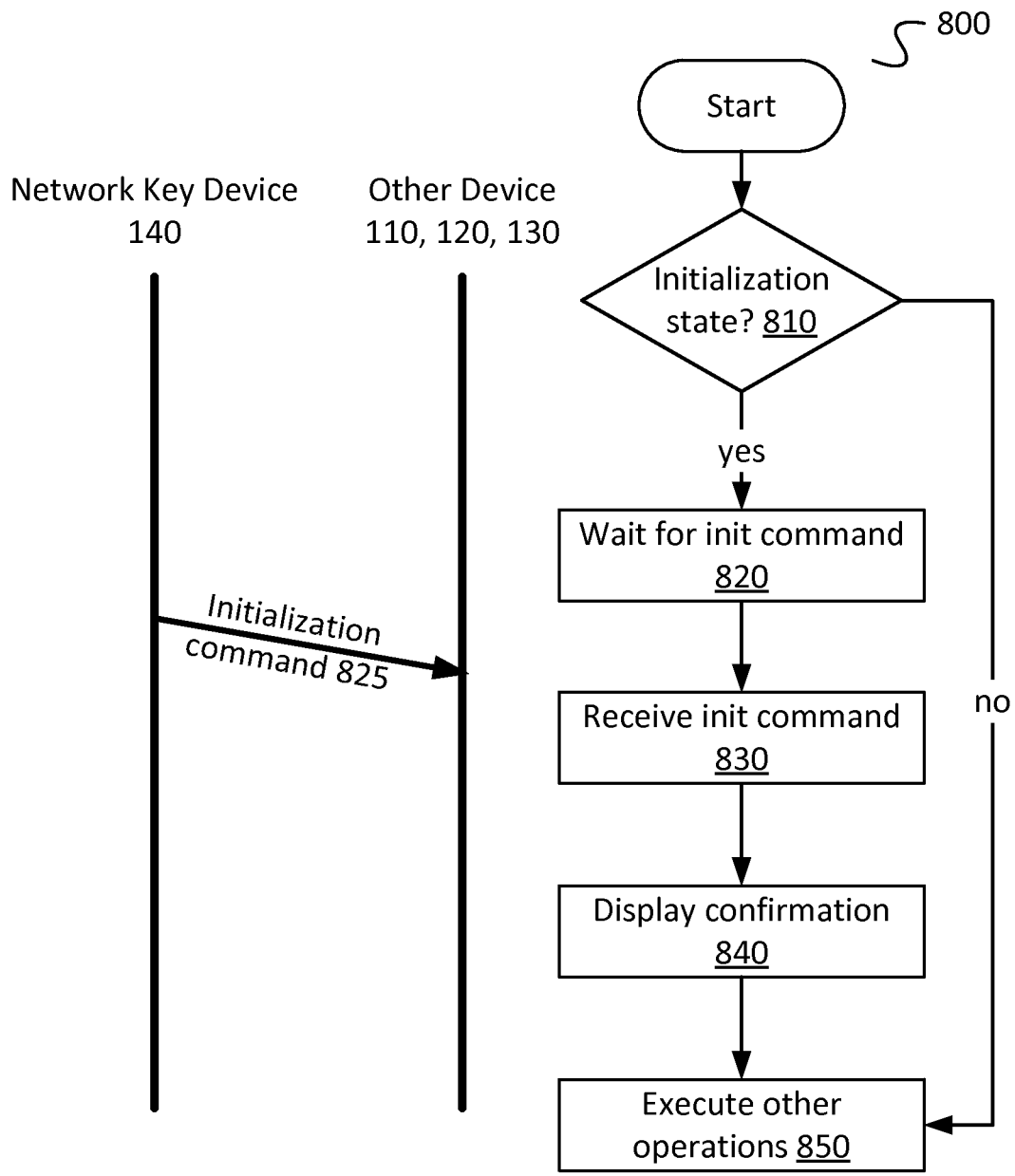
FIG. 8 is a flowchart and accompanying communication diagram for initialization of a device in the wireless light switch system of FIG. 1.

FIG. 8 illustrates a possible initialization method 800 for a remote switch device 110, load controller 120, or hub 130, implemented using the network key device 140. As discussed above, initialization of a device can include an initial configuration of the components of the device for operation on the home area network 150. Once this initial configuration is complete, the processor of the device determines whether the device is still in an initialization state at 810. If it is not in an initialization state, the device has already been provisioned with a network key. The device is already configured to carry out other operations at 850. In the case of the remote switch device 110, as mentioned above, the device may enter a sleep mode while awaiting a further signal.

If the device 110, 120, 130 remains in the initialization state, at 820 it waits for an initialization command from the network key device 140. At this stage, the network key device 140 can broadcast an initialization command 825 including the generated network key for receipt by any listening devices. At 830, the device 110, 120, 130 receives the initialization command and saves the network key in memory, then optionally signals the user that initialization was completed. The signal may be an audible signal or a visual signal, such as illumination of a light emitting diode (LED). Once initialization by the network key device 140 is complete, the device 110, 120, 130 can carry out other operations 850.

Once devices are initialized and have a network key, at least one remote switch device 110-load controller 120 set should be paired or associated. One possible protocol for pairing or associating a load controller 120 with one or more remote switch devices 110 is illustrated by the load controller state diagram in FIG. 9. Generally, since the wireless light switch system is preferably configured to reduce power consumption at the remote switch devices 110, which draw current from an internal battery rather than mains power, the protocol described here does not require the remote switch device 110 to receive any RF signals. The remote switch device 110 need only transmit one message containing its device identifier 222 and key 224.

Figure 9:
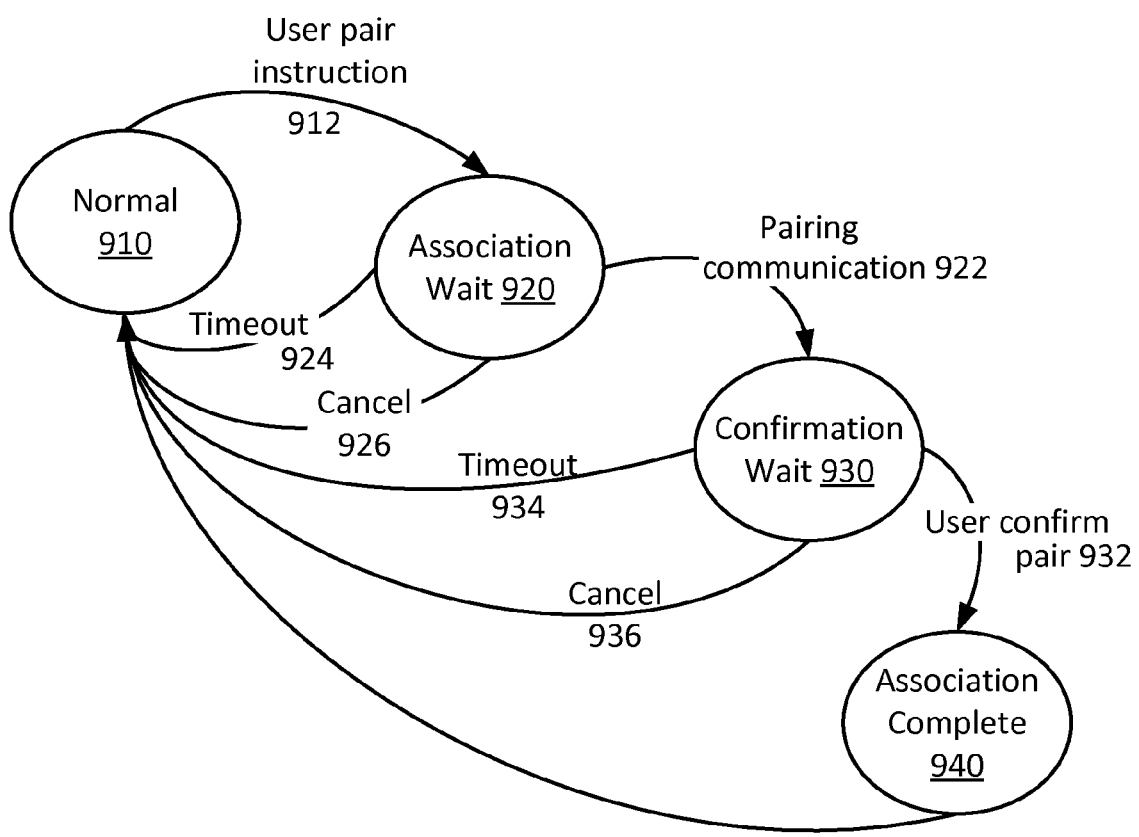
FIG. 9 is a state diagram of the load controller during an association procedure.

As shown in FIG. 9, an initialized load controller 120 begins in a Normal state 910, in which it is ready to receive commands. A user pair instruction 912 is received by the load controller 300, for instance by a key press or button press on the load controller 300. The load controller then enters an Association Wait state 920, in which a first timeout is set and the load controller awaits a pairing communication from a remote switch device 110. The load controller may signal to the user that it is in the Association Wait state, by a visible or audible signal (e.g. a sequence of LED flashes or a chirp). The communication from the remote switch device 110 is initiated by the user, again for example by a key press or other user action. The pairing communication is a message containing at least the switch device's switch identifier 224 and device key 226. If the timeout expires 924, or if an express "cancel" command is received from the user 926 ((for example, a different key press or button press on the load controller 120), the load controller 120 exits the Association Wait state 920 and transitions back to the Normal state 910.

If the pairing communication 922 is received from the remote switch device 110 before the timeout, the load controller 120 enters a Confirmation Wait state 930, during which it waits a user confirmation that the pairing is to be completed. Again, the load controller 120 may issue a signal to the user that it is awaiting a confirmation. A second timeout is set; and again, if the timeout expires 934, or if a "cancel" command is received 936, the Confirmation Wait state is cancelled and the load controller 120 returns to the Normal state. If the pairing confirmation 932 is received within the timeout period, then the load controller 120 enters an Association Complete stage 940 in which it completes the pairing by storing the switch identifier 224 and the device key 226 received from the remote switch device 110 in its association table. The load controller 120 then transitions back to the Normal state 910.

The pairing procedure may be repeated on the same load controller 120 for a plurality of remote switch devices 110 as described above, with the result that the association table stored in the load controller 120 will include identifiers and keys for multiple devices 110. The number of paired remote switch devices 110 may be limited only by available memory space. Similarly, the pairing procedure may be repeated with the same remote switch device 110 and multiple load controllers 120. As can be seen from the above protocol, the switch device 110 merely transmits its control data, and is not required to store any data pertaining to the pairing or the load controller 120.

In a more robust pairing procedure, the remote switch device 110 may include a receiver configured to receive messages from a load controller during the pairing process, confirming successful receipt of pairing information from the remote switch device 110. Thus, if the remote switch device 110 does not receive the confirmation within a defined period of time, the device 110 can retransmit its pairing information until confirmation is received or the pairing process is aborted. In still other pairing procedures, a remote switch device 110 equipped with a transmitter may initiate the pairing process by transmitting an initial pairing inquiry message in response to a user command (e.g. a key press or sequence of inputs), rather than having the pairing process initiated by the user at the load controller 120. In some implementations, it may not be necessary for the user to physically manipulate the load controller, which may be advantageous in the case where the load controller has already been installed.

Still further, a remote switch device 110 that is equipped to receive information from a load controller 120 may itself store pairing data, including load controller identifiers and device keys for one or more load controllers, which may be provided in a manner analogous to that described above in respect of the remote switch devices 110. If the remote switch device 110 stores pairing data, it may then address messages to specific load controllers using the load controller's identifier or a separate address also obtained during pairing, rather than merely broadcasting signals to all receivers. Different methods for wirelessly pairing devices within and outside a network environment will be known to those skilled in the art.

Figure 10:
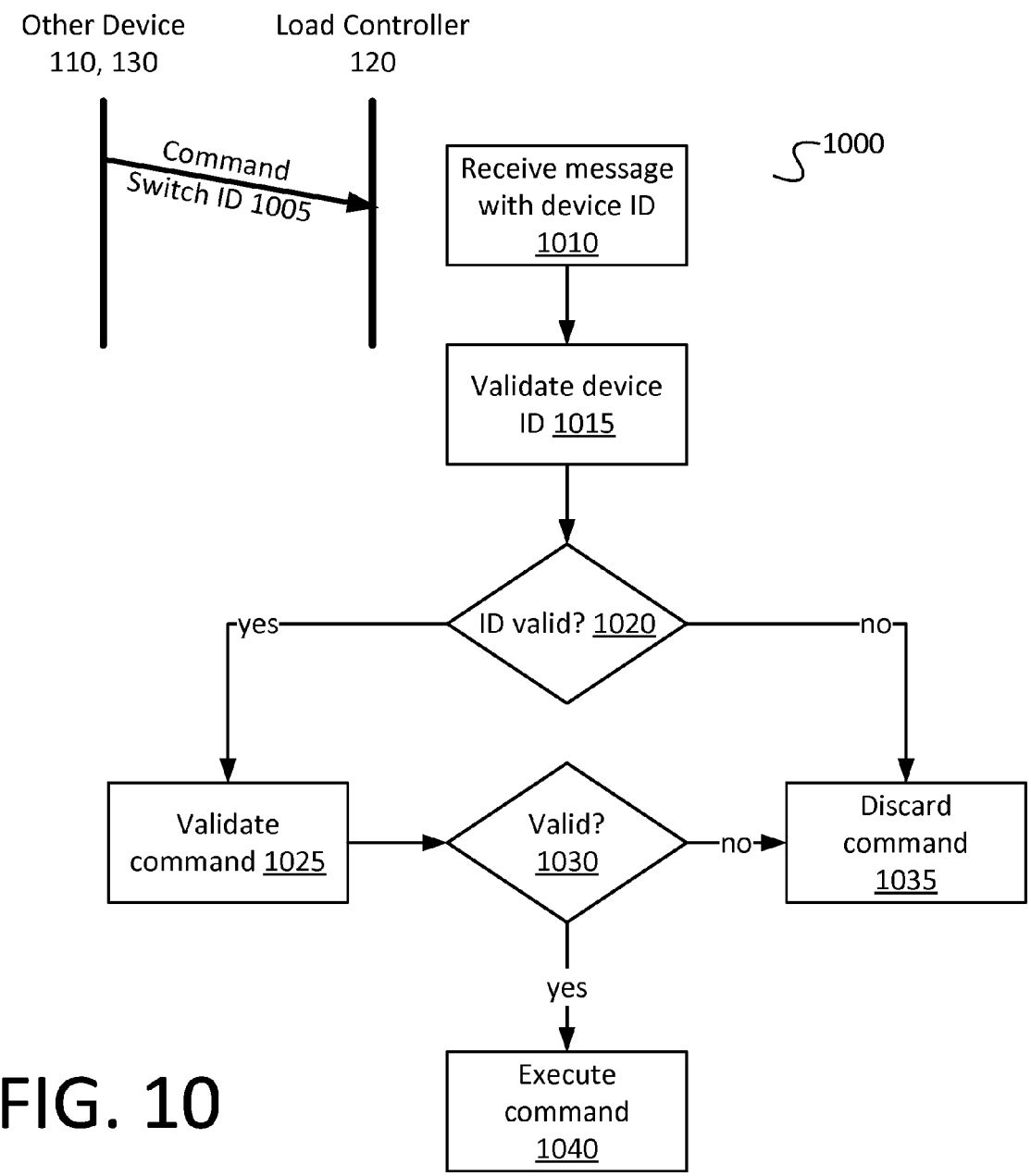
FIG. 10 is a flowchart and accompanying communication diagram for a load controller receiving and executing a command from another device in the wireless light switch system of FIG. 1.

Once the remote switch devices 110 and load controllers 120 in the network 150 have been initialized and paired, the load controllers 120 are ready to receive commands from their paired remote switch devices 110 and the hub 130. FIG. 10 provides an example method 1000 and accompanying communication diagram for processing of received wireless messages by a load controller 120.

A device, such as a remote switch device 110, broadcasts a command message 1005. As noted above, in the illustrated example system 100 the remote switch device 110 does not store pairing data; it simply broadcasts its commands for receipt and processing by any listening load controllers 120. The message includes, at a minimum, the remote switch device identifier 224 and the command to be executed by a target paired load controller 120. Each load controller 120 within range of the remote switch device 110 receives the message 1005 at step 1010. At 1015, the load controller 120 attempts to validate the device identifier received in the message. At 1020, the load controller 120 determines whether the identifier in the message is valid; i.e., that it is stored in the load controller's association table as a paired device. If the device identifier is determined not to be present, then at 1035 the message is discarded. If, however, the identifier is found in the association table, the load controller 120 then attempts to validate the command received in the message at 1025.

In some embodiments, the message payload comprises more robust data, including, for example, redundancy bits and checksums, which may also be used by the receiving load controller 120 to check the integrity of the received message at 1025. Also, as discussed below, additional data such as the rolling code 228 may be included in the messages to improve security in the wireless light switch system, and so the validation step 1025 may include an attempt to verify this additional data as well. Some or all of the message payload may be encrypted by the remote switch device 110 using a symmetric cipher key established using pairing information shared with the load controller 120 during pairing, in which case the validation step 1025 may include decryption of the message.

At 1030, the load controller 120 determines whether the command received in the message is valid. If it is not valid, the command is discarded at 1035 and no responsive action is taken. If, however, the command is valid, then at 1040 the load controller extracts the command and executes it. The load controller 120 thus executes commands received only from those remote switch devices 110 that were "whitelisted" as a result of the pairing procedure. The validation steps 1015-1020 and 1025-1030 may be implemented in the reverse order, although it is more expedient to check the device identifier first prior to decrypting and analysing a remainder of the message.

Since the remote switch device 110 broadcasts its messages in the main embodiment described herein, it is able to control a number of load controllers 120 with a single burst of data, rather than transmitting multiple addressed messages to each paired device, which increases communication time and drain on the remote switch device battery.

Example commands that may be sent by a remote switch device 110 configured to issue simple ON/OFF operation commands to a load controller 120 are set out in Table 1 below:

TABLE 1

Example Commands

| Command Name | Description |
| --- | --- |
| Switch OFF | Switch off the light |
| Switch ON | Switch on the light |
| Initiate Association | Start association process (load controller enters Association Wait state) |
| Switch ON/OFF | Change current status of the light; if it is on, turn it off; if it is off, turn it on |
| Erase Pairing | Erase pairing with source remote switch device (unlike CLEAR, which clears all pairings) |

The ability to transmit the aforementioned CLEAR command described above may be restricted only to a designated master remote switch device 110 or the hub 130.

The hub 130 may be configured to send data to, and receive data from, the load controllers 120. The messages sent by the hub 130 may be broadcast, multicast, or unicast to many or only one load controller 120. For example, the hub 130 may broadcast an initial polling message to obtain identifiers for all controllers 120 on the home area network 150. Subsequently, the hub 130 can specifically address one or more load controllers 120 with a message containing an operation command, such as a request for status or to change the status of a light fixture. The hub 130 may also transmit ON/OFF and Status Change commands as described above in Table 1.

To reduce the likelihood of attacks on the home area network 150 or individual load controllers 130 by malicious third parties, encryption and rolling (hopping) codes may be used to mitigate the risk of eavesdropping and replay attacks. These measures may be implemented together with a robust network packet payload including additional redundancy checks, such as the example set out in Table 2 below.

TABLE 2

Switch Packet Payload Example

| Content | Offset (Bytes) | Length | Comment |
| --- | --- | --- | --- |
| Preamble | 0-12 | 13 bytes | not encrypted |
| Synchronization | 13-14 | 16 bits | not encrypted |
| Switch Identifier | 15-18 | 32 bits | not encrypted |
| Command | 19 | 8 bits | encrypted |
| Rolling Code | 20-23 | 32 bits | encrypted |
| Checksum | 24 | 8 bits | encrypted; XOR of bytes 19-23 |
| Battery Voltage | 25-26 | 16 bits | encrypted |
| Random Number | 27-28 | 16 bits | encrypted |
| Checksum | 29 | 8 bits | encrypted; XOR of bytes 25-28 |
| Combination | 30 | 8 bits | encrypted; XOR of bytes 20, 25 |
| Combination | 31 | 8 bits | encrypted; XOR of bytes 21, 26 |
| Combination | 32 | 8 bits | encrypted; XOR of bytes 22, 27 |
| Combination | 33 | 8 bits | encrypted; XOR of bytes 23, 28 |
| Checksum | 34 | 8 bits | encrypted; XOR of bytes 30-33 |
| CRC | 35-36 | 16 bits | not encrypted |

Encryption of some or all of the message payload may be implemented, as mentioned above, using a symmetric cipher key based on information provided by the remote switch device 110 to the load controller 120 at the time of pairing. In the example of Table 2, not all content of the message is encrypted. It will be appreciated that many different encryption algorithms and symmetric or asymmetric key arrangements may be employed; the following is but one example. Rather than using the device key 226 that was provided by the remote switch device 110 to the load controller 120 on pairing as the encryption key, a separate cipher key may be generated at either the remote switch device 110 or the load controller 120 from the device key 226 using an algorithm configured at both devices 110, 120, or agreed upon by both devices during the pairing. For example, the cipher key may be calculated as an exclusive-or combination of sets of bytes of both the device key 226 and the remote switch device's identifier 224. The cipher key is then optionally stored in memory at the remote switch device 110, or else computed on the fly when required by the remote switch device 110 to transmit a message. Similarly, the load controller 120 can store a copy of the cipher key in its association table, or else compute the cipher key upon receipt of a message that requires decryption. Since the message includes the switch identifier 226 (sent in the clear, as indicated in Table 2), when a message is received, the load controller 120 can extract the switch identifier from the message to key into the association table to retrieve the corresponding cipher key, or else retrieve the corresponding data required to compute the cipher key.

As mentioned earlier, the message can include a rolling code that is stored at both the remote switch device 110 and the load controller 120 (at the latter, in the association table, in association with the corresponding switch device identifier), and is used by the load controller 120 to validate a received command. In the example of Table 2 above, the rolling code is a 32-bit value that is retrieved from memory of the remote switch device 110 and inserted in the message payload then encrypted. Once the message is sent, the rolling code is incremented by 1 at the remote switch device 110 and stored.

When the message is received by a load controller 120 and the device identifier included in the message is validated, the load controller extracts the rolling code in the message and compares it to the rolling code 346 stored in its memory 330 for that device identifier. The rolling code received in the message is expected to be greater than the rolling code 346 stored at the load controller 120, since the remote switch device 110 would have incremented its copy of the rolling code 228 after the previous transmission.

It will be appreciated, however, that in some cases the rolling code 228 stored at the remote switch device 110 may have been incremented by more than 1 since the last time a transmission was received by the load controller 120, for instance due to error or a failed transmission. Thus, a range or window of permissible offsets between the rolling code received in the message and the rolling code stored at the load controller 120 is defined. In one example, an "open" window, or offset between received and stored rolling codes at the load controller 120, is set at 16; thus, the received rolling code in the message must be greater than the stored rolling code 346, with an offset of no more than 16 from the stored rolling code 346. If the received rolling code meets this condition, the load controller 120 may validate the received command, and stores the received rolling code in place of the stored rolling code 346, thus updating the stored rolling code.

In some cases, the offset between the received rolling code and the stored rolling code 346 is outside the defined open window. In that case, the load controller 120 will not execute the received command. However, the remote switch device 110 and the load controller 120 may have fallen out of synchronization due to interference or due to one of the devices being moved out of range, so a re-synchronization window is defined for a select range of offsets greater than the offsets permitted within the open window. If the offset falls within the range of offsets permitted in the re-synchronization window, the rolling code received in the message is temporarily stored for the remote switch device 110 in the association table. If a subsequent message is received from the same remote switch device 110 with a further rolling code with an offset from the temporarily stored value that falls within the open window range, then the newly received rolling code is stored for the remote switch device 110, and the controller 120 may then execute the received command in the new message. If, however, the offset of the first received rolling code falls outside both the open window and re-synchronization window, the controller neither executes the received command nor implements re-synchronization.

Table 3 illustrates possible windows for above rolling code implementation for a rolling code 32 bits long, in which the range of possible offsets is zero to $2^{32}-1$:

TABLE 3

Rolling Code Offset Windows

| Window | Offset Range |
| --- | --- |
| Open (rolling code valid) | 1 to 16 |
| Re-synchronization | 17 to $2^{31}$ |
| Block (no action) | $2^{31}+1$ to 0 |

In Table 3, the open window for offsets for which received rolling codes are validated is the smallest window, covering only offsets from 1 to 16. The re-synchronization window then covers nearly half of the remaining possible offsets greater than 16. The "block" window, in which the offset between the received rolling code and the stored rolling code 346 is considered too great to permit re-synchronization, covers the remaining range of possible offsets, and includes the case where the offset is zero. The various ranges for these windows may be set arbitrarily. For example, the range of 1 to 16 for the open window may be defined on the presumption that most transmissions from the remote switch device 110 to the load controller 120 will not fail. This open window may of course be set to cover a greater or smaller range of offsets depending on the overall performance of the wireless light switch system 100, and the likelihood that a transmission will fail. In a less robust system subject to high failure rates, a larger open window may be appropriate.

In one implementation, the rolling code value and other control data are stored in EEPROM at both the remote switch device 110 and the load controller 120. As can be seen from the foregoing rolling code implementation, the rolling code values transmitted or received by a device are generally monotonically increasing by a value of 1, and the changed value must be stored at both the transmitting and receiving devices. However, as those skilled in the art will appreciate, solid state storage media such as EEPROM can endure only a finite number of write-erase cycles before its integrity is degraded and the memory becomes unreliable. Common types of EEPROM currently available have write-erase cycle limits ranging from about 100,000 to 1,000,000. Assuming an average usage rate of about 100/operations per day for a remote switch device 110 or load controller 120, 100,000 write-erase cycles is equivalent to about 2.74 years of use. This usage rate, which is possible in a high-traffic area, results in an expected EEPROM lifetime well below the expected lifetime for a home automation product. While memory rated with a higher duty cycle could be used instead, this substitution would increase the cost of manufacturing the device.

To address this problem, in a further embodiment, a wear-leveling technique is applied to the EEPROM to extend the potential lifespan of the memory device. It may be noted that in the above rolling code implementation, the least significant bit (LSB) of the rolling code changes with each transmission/reception, while more significant bits change less frequently, meaning that when the memory address storing a LSB reaches its end of life, the second LSB may have half of its life left, while the third LSB may have three-quarters of its life remaining, and so on.

Different coding methods exist that permit write-erase cycles to be distributed across different memory locations. For example, in a first coding method, referred to as "2-4 coding", two binary digits are used to represent four numbers according to the generation formula $a'_1 = a_1$; $a'_0 = a_1 \otimes a_0$, as set out in Table 4:

TABLE 4

2-4 Coding

| Original Number | | 2-4 code |
| --- | --- | --- |
| Decimal | Binary | |
| 0 | 00 | 00 |
| 1 | 01 | 01 |
| 2 | 10 | 11 |
| 3 | 11 | 10 |

Thus, in the original set of binary numbers, the LSB changed on every count compared to the most significant bit (MSB), which changed only every other count in this example (i.e., half as frequently as the LSB). However, after encoding with 2-4 code, the change rate of the LSB drops to every other count, like the MSB. Using this encoding, the potential lifespan of the LSB is now double the lifespan when the unencoded values are stored. It will be appreciated by those skilled in the art that the 2-4 coding is a trivial case of a general N-2N coding scheme that, when applied to a series of values increasing by 1, potentially extends the lifespan of memory by N times compared to unencoded values since each encoded bit position changes value only every N counts rather than every 1 count. Thus, in a 4-8 coding scheme, the LSB changes only every four counts rather than every count; and in an 8-16 coding scheme, the LSB changes only every eight counts. However, with increasing N the coding scheme introduces increasing redundancy (by one bit for 4-8 code, and four bits for 8-16 code). The 2-4 coding scheme, however, does not add redundancy.

Another scheme that may be employed is a bit shift scheme that again distributes operations across all bits evenly. In a bit shift scheme, the position of the LSB is changed so that it occupies each location during a cycle. Thus, for example, the bit order rotates for a three-bit binary number increasing by 1, the bit order rotates every eight ($2^3$) counts from $a_2a_1a_0$ to $a_1a_0a_2$ to $a_0a_2a_1$. At the end of three loops through eight number counts (from 000 to 111), every bit position will have changed the same number of times (14), thereby increasing the lifespan by approximately 1.714 times. For N bit shifts, after N loops the total number of changes or transitions $T_b$ of each bit can be expressed as $$T_b = 2^1 + 2^2 + 2^3 + \ldots + 2^N = 2^{\wedge}(N+1) - 2$$

And the life expansion factor is calculated as $$E = \frac{T_a}{T_b} = \frac{N2^N}{2^{N+1} - 2} = \frac{N2^{N-1}}{2^N - 1}$$

where $T_a$ is the total number counted. A similar principle may be applied to bytes.

Accordingly, in one embodiment, 2-4 coding and a byte shift are combined and applied to the rolling code scheme described above. The 2-4 code is applied only to the lowest two bits of the rolling code, thereby doubling the potential life span of the EEPROM. In addition, each time the lowest 8-bit value overflows, the byte order is changed as follows: $a_3a_2a_1a_0 \rightarrow a_0a_3a_2a_1 \rightarrow a_1a_0a_3a_2 \rightarrow a_2a_1a_0a_3$. The life expansion factor may then be calculated as:

$$E \geq \frac{4 \times 256}{128 + 1 + 1 + 1} = 7.817$$

which, when multiplied by the 2.74 year estimate above, yields a lifespan of about 21 years, which is more acceptable. Thus, by combining the foregoing N-2N and bit shifting schemes, and improvement in EEPROM performance may be realized.

Figure 11:
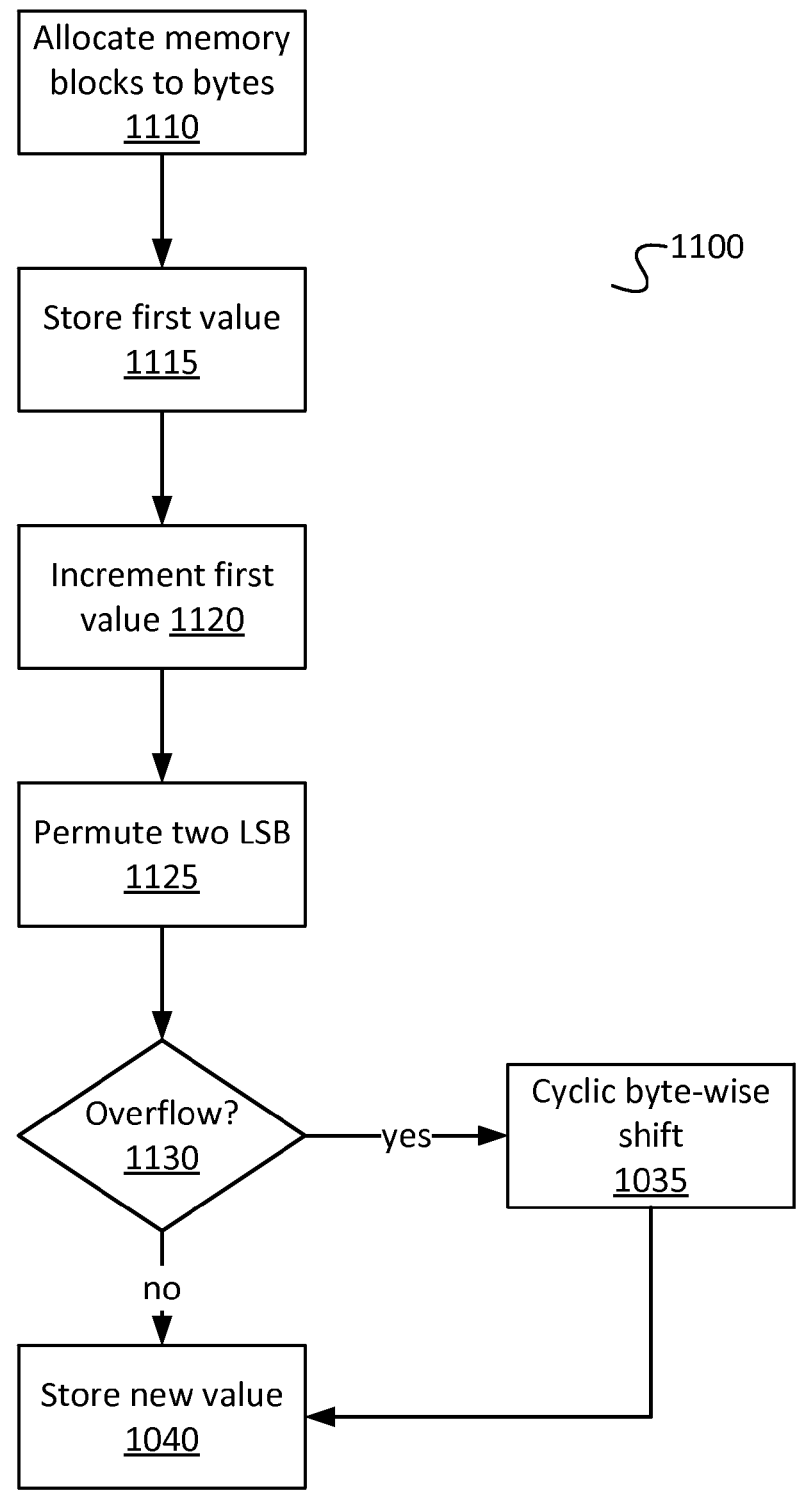
FIG. 11 is a flowchart illustrating a method for storing incremented values in memory.

Thus, in the case of a rolling code being incremented at the remote switch device 110, the remote switch device 110 may implement a method such as the method 1100 shown in FIG. 11. At 1110, a number of blocks of memory (e.g., bytes) are allocated to storage of the rolling code. In the example rolling code discussed above, the value to be stored is 32 bits long; thus, four blocks of one byte each in the EEPROM are allocated. A first value is then stored in the allocated memory at 1115, with the least significant byte of the first value being stored in a first block, the next least significant byte being stored in a second block, the second most significant byte being stored in a third block and the most significant byte in a fourth block. Subsequently, at 1120, the initially stored value is read out of memory, and an instruction is received to increment the last stored value. In the rolling code example above, the value is read out and added to a message payload, and an instruction to increment the value is executed after the message is transmitted. The value is thus incremented.

However, prior to storage of the incremented value in the allocated memory blocks, at least one permutation is applied to the incremented value. First, at 1125, the two least significant bits of the value are encoded according to the 2-4 code described above. As explained above, this results in a twofold increase in memory life. Next, a byte-wise shift is applied to the allocation of the bytes to the designated memory blocks according to a predetermined condition. At 1130, it is determined whether the increment resulted in an overflow of the least significant byte of the value. If so, a cyclic byte-wise shift is applied to reorder the bytes of the value with respect to the allocated memory blocks, as described above. Thus, the least significant byte is assigned to the previously-defined fourth block; the next least significant byte is assigned to the first block; the second most significant byte is assigned to the second block; and the most significant byte to the third block. If at 1130 it is determined that there is no overflow of the least significant byte, then no shift is implemented. A mapping may be stored in the memory of the device correlating a logical address for each byte to the physical address of each block.

A similar procedure may be implemented at the load controller 120, although in the case of the load controller 120 the values may not be incremented by 1.

As noted earlier, the size and/or electrical requirements of some prior art wall-mounted wireless switch devices impose limitations on the installer of wireless light fixture controls, since the device may require installation in an electrical box either to accommodate its bulk or to provide the necessary electrical wiring to the building power supply. The wireless light switch system 100 described herein may be implemented using remote switch devices and load controllers configured to provide flexibility in installation in new or old structures, and facilitate retrofitting of existing buildings. A particular example of a remote switch device and load controller is illustrated in FIGS. 12 through 23.

Figure 12:
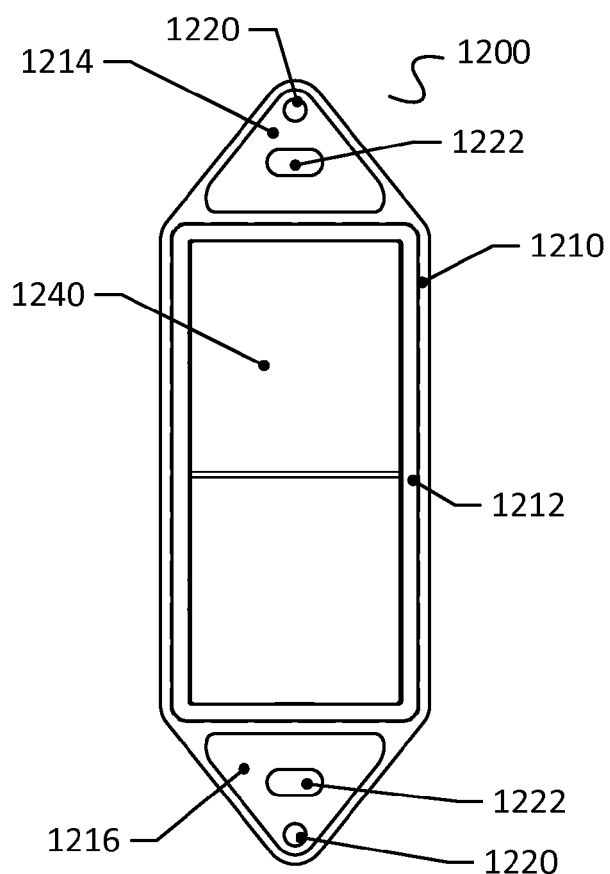
FIGS. 12 and 13 are front and back elevations, respectively, of an assembled remote switch device.
Figure 13:
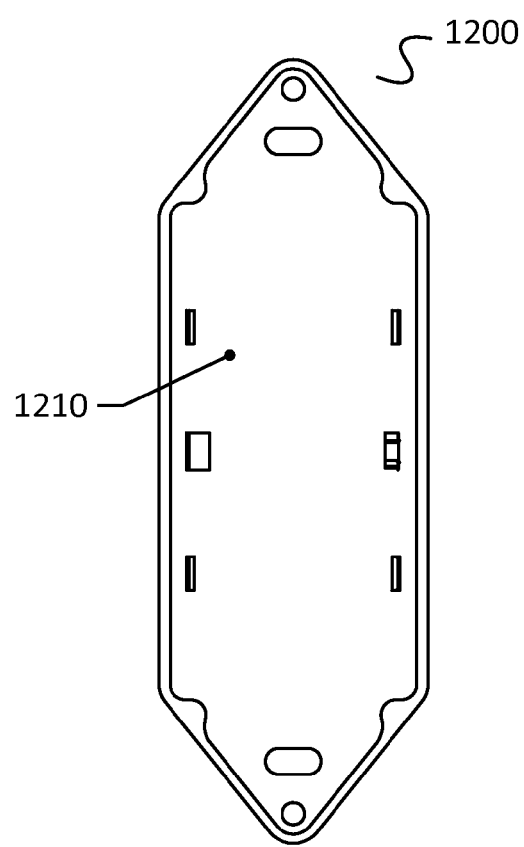

FIGS. 12 and 13 illustrate front and rear views of an example remote switch device 1200 configured to fit within a common single-gang or multi-gang switch plate, without requiring installation over an electrical box. The remote switch device 1200 includes a casing comprising a base 1210 and a cooperating rocker-type switch shell 1240. The casing components may be manufactured of a thermoplastic nylon, polycarbonate, or any other material suitable for the manufacture of switch plates that does not significantly attenuate or block RF transmissions to or from the transceiver of the remote switch device. In this particular example, the rocker shell 1240 and the base 1210 together define a substantially closed enclosure that contains components of the remote switch device 1200, including the transceiver/transmitter and antenna, memory, microprocessor, battery, user control interfaces for both "ON" and "OFF" positions of the rocker shell 1240, and associated circuitry. In other embodiments, an electrical control other than a rocker switch may be provided.

Figure 16:
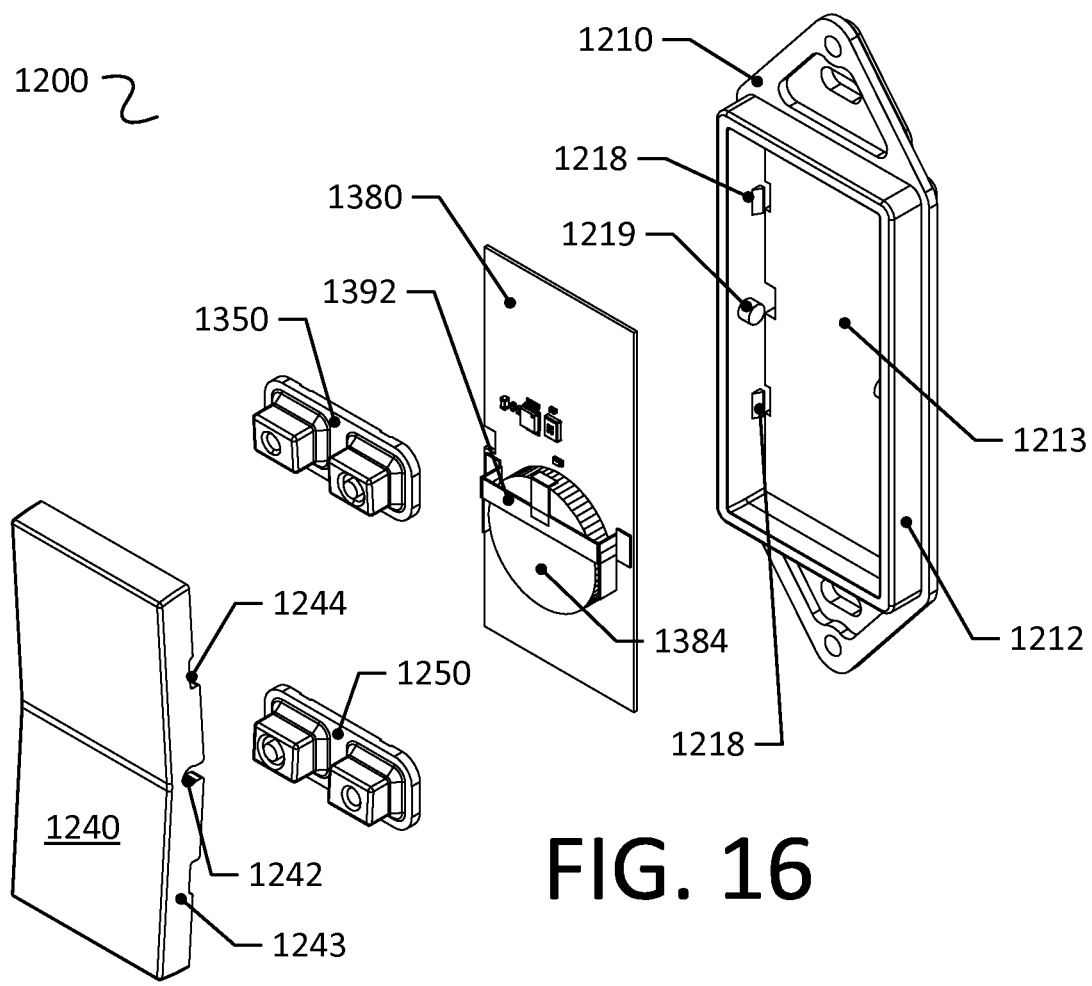
FIG. 16 is an exploded perspective view of the remote switch device of FIGS. 12 and 13.

The base 1210 includes a back plate with a substantially rectangular lip or sidewall 1212 projecting from the front surface of the plate. The back plate and the sidewall 1212 together define part of an enclosure 1213 (indicated in FIG. 16). The sidewall 1212 can be substantially continuous as illustrated in the accompanying drawings, and defines part of an enclosure sized to receive components as shown in FIG. 16, and the rocker shell 1240. In some examples, the sidewall 1212 may comprise a number of distinct projections that are not continuous, but still substantially define the enclosure. As will be seen more clearly in FIG. 14, in this particular example the sidewall 1212 is sized to fit within the electrical control aperture of a typical, commercially available Decora® or similar switch plate. For example, a Leviton Decora® brand Designer Wallplate model 80401-GFI from Leviton Manufacturing Co., Inc., New York, USA, has an aperture of 33.2 mm wide by 66.8 mm high. The exterior dimensions of the sidewall 1212 in one implementation of the remote switch device 1200 as shown in FIG. 12 is 33 mm wide by 66.5 mm high. The exterior dimensions may of course be sized as required to fit within differently-sized apertures of alternative switch plates.

Flanges 1214, 1216 extend from the top and bottom, respectively, of the base 1210 and provide bores 1220 and slots 1222 for receiving fasteners (not shown) for mounting the remote switch casing to a switch plate and/or a wall or existing electrical box (although as noted above, mounting on an electrical box is not required). The slots 1222 may be provided with a counterbore or may be otherwise recessed from the front surface of the back plate to accommodate the depth of a screw head. Alternatively, the remote switch device 1200 can be affixed to a wall or other surface using double-sided tape or another adhesive mounting means. The back surface of the base 1210 in the implementation shown in the figures therefore provides a substantially flat area to which an adhesive can be applied for mounting on a flat surface.

Figure 14:
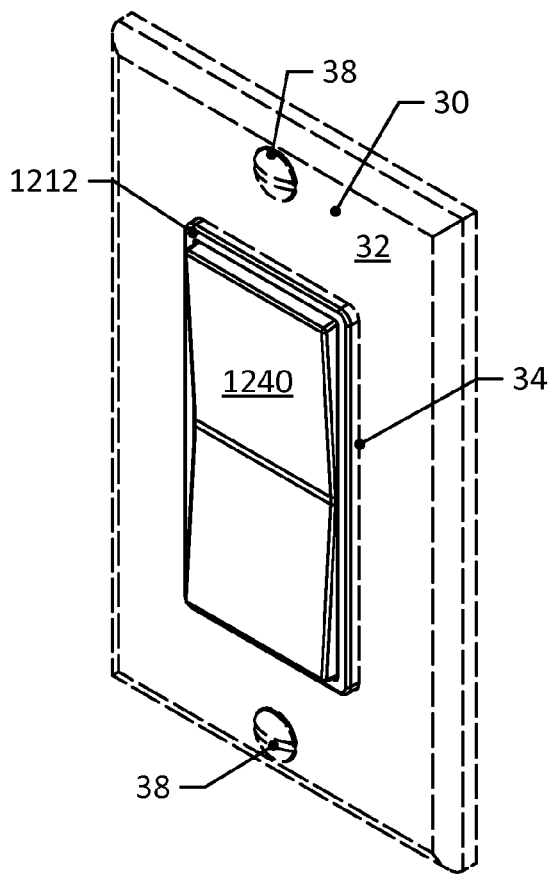
FIGS. 14 and 15 are front and back perspective views, respectively, of the remote switch device of FIGS. 12 and 13 as they would be mounted in a standard switch cover plate.
Figure 15:
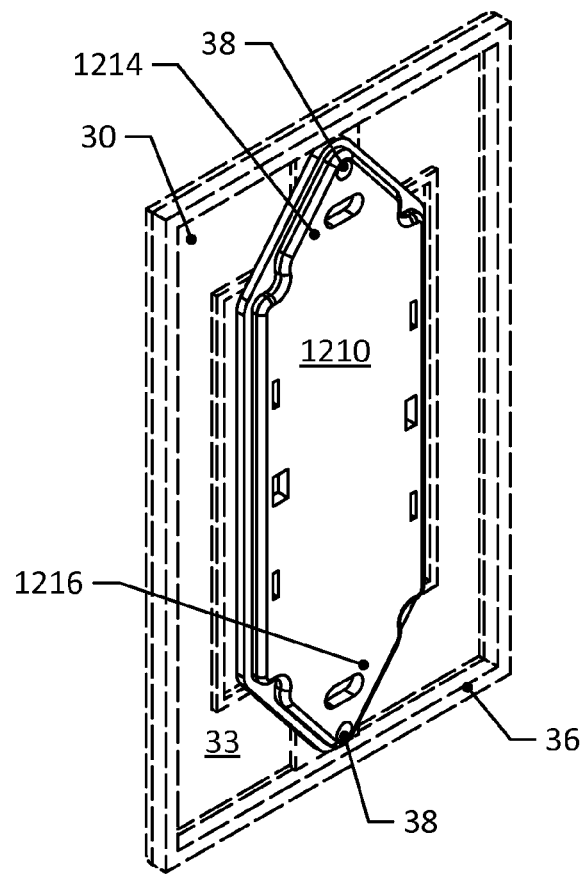

Turning to FIGS. 14 and 15, the assembly of the remote switch device 1200 in a typical single-gang Leviton Decora® switch plate 30 (depicted in phantom lines) is shown. Seen from the front face 32 of the switch plate 30, the sidewall 1212 and rocker shell 1240 protrude through the aperture 34 of the switch plate 30. The rear surface 33 of the switch plate 30 is recessed from the wall-contacting rear surface 36 of the switch plate 30, defining a space for receiving the base 1210 of the remote switch device 1200. The flanges 1214, 1216 are therefore retained behind the switch plate 30. Screws 38 pass through bores provided in the switch plate 30 and the bores 38 in the base 1210. The thickness of the flanges 1214, 1216 is selected in order to permit the switch plate 30 to be mounted against a flat surface without creating a gap between the surface and the wall-contacting rear surface 36. It will be understood that multiple remote switch devices 1200 may be similarly mounted in a multi-gang switch plate, or that a remote switch device 1200 can be mounted in a multi-gang switch plate in combination with a traditional wired switch or other electrical control or outlet.

The remote switch device 1200 is shown in exploded view in FIG. 16. The enclosure 1213 receives a circuit board 1380 bearing components of the remote switch device 1200 and elastically deformable contact pads or actuators 1350. Tabs 1218 extending from the interior surface of the sidewall 1212 retain the circuit board 1380 in position. The enclosure is further defined by a rocker shell 1240, which is formed of two oblique faces 1241*a*, 1241*b* (indicated in FIG. 17) meeting at a central pivot axis. In this example, the switch has two positions (an "ON" and "OFF") associated with depression of either oblique face. In other examples of rocker switches, the rocker may comprise only one face that is pivotably mounted at one end to a base, not shown in the accompanying drawings. It will be appreciated that such other types of rocker switches may be adapted in accordance with the teachings herein. The faces 1241*a*, 1241*b* are described as "oblique" as they are both oblique to one another and to a plane of the base 1210. As can be seen more clearly in FIG. 17, on the inside of the rocker shell 1240 the oblique faces 1241*a*, 1241*b* define an internal angle greater than 180°.

At least one sidewall 1243 depends from the oblique walls of the rocker shell 1240. In this example, the sidewall 1243 of the rocker shell 1240 is sized to fit within the interior sidewall 1212 so as to retain the circuit board 1380 and actuators 1350 within the enclosure. The sidewalls 1243 of the rocker switch are grooved 1242 at the switch's fulcrum or pivot axis. Posts or lugs 1219 projecting from either interior side of the base sidewall 1212 ride in the grooves 1242 when the casing is assembled to permit the rocker switch to move in a rocking motion between an "ON" position (e.g., depression of an upper portion of the rocker switch) and an "OFF" position (e.g., depression of a lower portion of the rocker switch). In the aforementioned implementation, the at least one sidewall 1243 is substantially straight, but the outer surface of the sidewall 1243 at the ends of the rocker shell 1240 (i.e., the ends that are substantially parallel to the pivot axis) may be slightly bevelled to minimize rubbing between the sidewall 1243 and the base sidewall 1212 as the rocker shell 1240 travels between "ON" and "OFF" positions. It can be seen in FIGS. 16 and 17 that the sidewall 1243 of the rocker shell 1240 has a greater depth closer to the pivot axis than at the ends of the rocker shell 1240.

Figure 17:
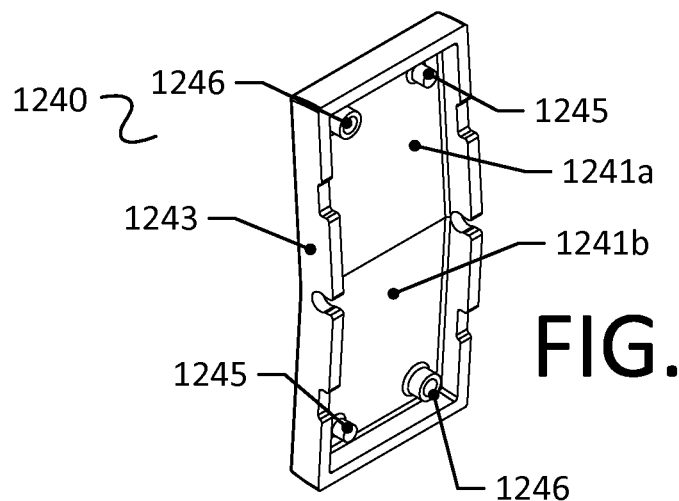
FIG. 17 is a rear perspective view of a rocker switch shell of the remote switch device of FIG. 16.

As can be seen in the rear perspective view of the rocker switch shell 1240 in FIG. 17, the interior face is provided with sets of posts 1245, 1246. These posts 1245, 1246 provide engagement means for retaining the actuators 1350 in position.

The base 1210 and its sidewall 1212, and the sidewall 1243 and oblique walls 1241*a*, 1241*b* of the rocker shell 1240, together define the enclosure 1213. It will be appreciated by those skilled in the art that as a result of the general configuration of the rocker shell 1240 and its pivoting action when mounted on the base 1210, the enclosure shape will change when the remote switch device 1200 actuated and released. In the aforementioned implementation, the base sidewall 1212 is approximately 2.25 mm thick, resulting in the enclosure 1213 having a width of approximately 28.5 mm by 62.5 mm high. The depth of the enclosure on the base 1210 is approximately 7 mm, and the overall depth of the base 1210 is approximately 9 mm. The base sidewall 1212 may project only by about 5.5 to 6 mm from the base 1210. The overall height and width of the rocker shell 1240 is approximately 62 mm by 28 mm with an approximately 2 mm thick sidewall 1243 and oblique walls 1241*a*, 1241*b*. On the interior of the rocker shell 1240, the sidewall 1243 depth ranges from approximately 4.5 mm closer to the pivot axis to 3.5 mm closer to the ends (excepting any cutouts to accommodate other parts, such as the grooves 1242). The overall dimensions of the remote switch device 1200, including the flanges 1214, 1216, are approximately 104 mm high by 35 mm wide with a depth of 10 mm.

Figure 18A:
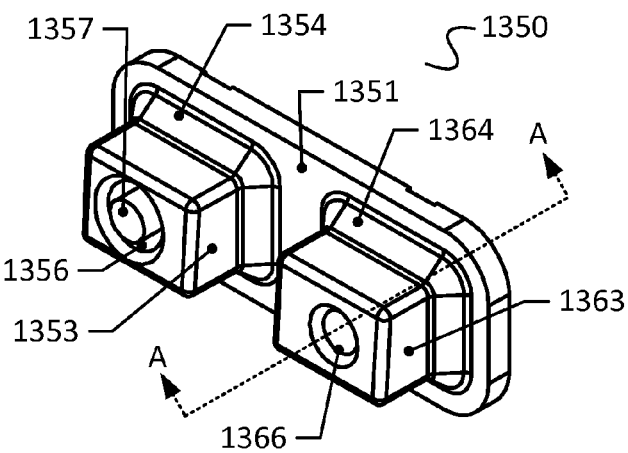
FIGS. 18A and 18B are front and back perspective views, respectively, of an actuator component of the remote switch device as shown in FIG. 16.
Figure 18B:
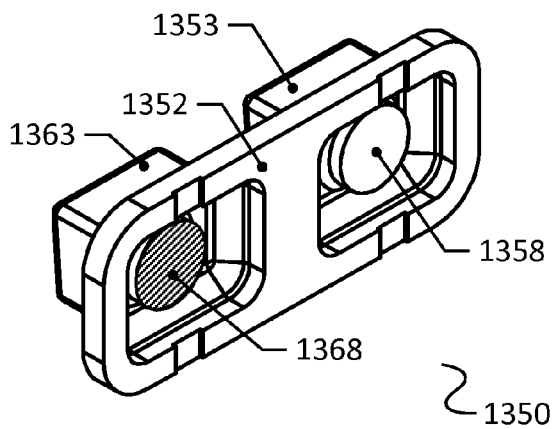
Figure 18C:
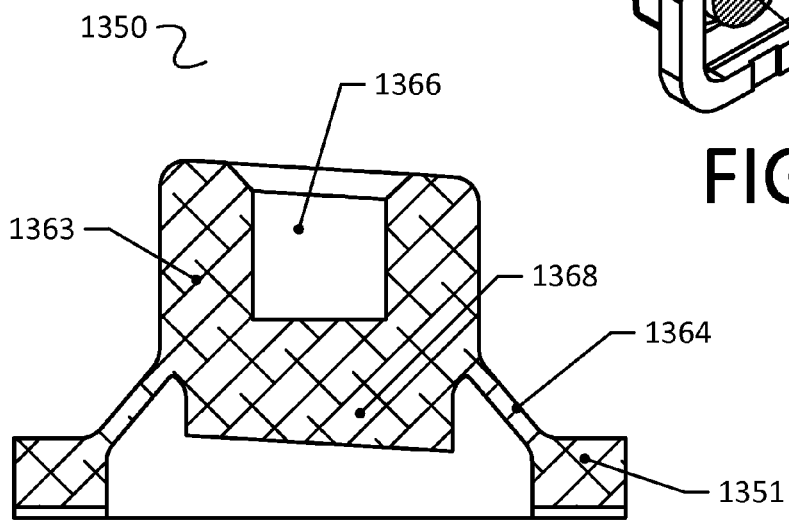
FIG. 18C is a cross-sectional view of the actuator component of FIG. 18A taken along line A-A.

The actuators 1350 are shown in greater detail in FIGS. 18A to 18C. The actuators may be referred to as "dome-type" as they operate on a similar principle as a keyboard dome switch. Generally, the actuators 1350 comprise a polygonal dome-type structure housing an interior stem or nub bearing a conductive pad, such that when force is applied to a bearing surface on the exterior of the structure is compressed, the interior nub and the conductive pad are displaced towards the rear of the actuator as to come into contact with an adjacent switch contact.

In the depicted example, an actuator 1350 is manufactured using a suitable material that provides an appropriate amount of elastic deformation, such as silicone or polyurethane. The structures comprise generally solid rectangular-shaped keys or contact members 1353, 1363 supported by a collapsible collar 1354, 1364, respectively, which in this example comprise angled walls extending from a front face 1351 of a base of the actuator. Each contact member 1353, 1363 is provided with cooperating engagement means corresponding to the engagement means provided on the interior of the rocker switch shell 1240. In this particular example, one of each type of post 1245, 1246 is provided at each of the "ON" and "OFF" positions of the rocker switch, so the contact members 1353, 1363 are therefore provided with corresponding recesses 1356, 1366 matching the shape of the corresponding shape of the post 1245, 1246. The posts in this example vary in shape so as to ensure that the actuators 1350 are correctly aligned in the remote switch device 1200.

The junction of the rectangular keys 1353, 1363 and the collapsible collars 1354, 1364 define a bending perimeter. On the rear face 1352 of the actuator 1350, shown in FIG. 18B, the angled walls 1354, 1364 define cavities. Nubs 1358, 1368 protrude from the rear side of the rectangular key into the interior of a cavity, but do not extend all the way to the rear surface 1352 when the actuator 1350 is in an unstressed state. One nub is provided with a pad of graphite or another suitable conductive material, as indicated by the shading in FIG. 19B. The nubs in this example protrude from the contact members 1353, 1363 into the collapsible collar 1354, 1364, but in some examples the nubs are not included, and the conductive pad 1368 is provided on an interior surface of the contact member 1363 within the collar 1364.

When the remote switch device 1200 is assembled, the rear surfaces of the actuators 1350 are in contact with the circuit board and are positioned such that conductive pads provided on the actuators 1350 are substantially aligned with corresponding switch contacts on the circuit board, without contacting the switch contacts. The rocker switch may be considered to be in a neutral position (in neither an "ON" or "OFF" position, although the associated light fixture may be in an ON or OFF state). The switch contacts are not shown in the figures, but may comprise a pair of circuit traces on the circuit board. When the rocker shell 1240 is depressed by a user at either the "ON" position or "OFF" position, the posts 1245, 1246 in that position press on the corresponding contact members 1353, 1363, causing the actuator structure to collapse along the bending perimeter and force the contact member and conductive pad move through the space defined within the collar 1354, 1364 and the base of the actuator 1350 to contact the circuit traces, thus closing a circuit on the board. The pressure is applied via the rocker shell 1240, and it will be noted from the cross-sectional view in FIG. 18C that the upper bearing surface of the contact member 1363 is substantially flat and inclined to generally correspond to the oblique configuration of the rocker shell face. When the pressure is applied to the rocker shell 1240, the rocker shell 1240 contacts an area of the upper surface of the contact member 1353, 1363 rather than merely a single point, which may be the case with a true dome structure. The greater area of contact provides for better contact between the conductive pad and the switch contact on the circuit board. When pressure on the rocker shell 1240 is released, the actuator 1350 will return to its normal state, pushing the rocker shell 1240 back to its neutral position.

This response is unlike a conventional electromechanical rocker light switch, which will be latched in the "ON" or "OFF" position until the switch is actuated again, thereby providing the user with a form of tactile and visual feedback indicating that the user's action on the switch was successful. However, the slight resistance of the silicone or polyurethane actuators 1350 and collapse of the actuator structure under user pressure provides a form of tactile feedback that replaces the tactile feeling of operating a conventional rocker switch.

In one implementation, the maximum height of the actuator 1350 is approximately 6.75 mm, including the contact member 1353, 1363 supported on an angled collar 1354, 1364 approximately 1.5 mm in height at an angle of about 50°, in turn supported on a base of about 1.5 mm thickness. The actuator 13150 can be accommodated within the enclosure 1213 of the aforementioned implementation of the remote switch device 1200 when the rocker shell 1240 is in a neutral or non-actuated state. In this particular implementation, the contact member 1363 has an upper bearing surface inclined at about 3-4°.

It may be note that the actuators 1350 depicted in the figures include a pair of contact members and collars, although it is only necessary, given the arrangement of the circuit in this example, for each actuator 1350 to comprise only one contact member assembly. This particular configuration of the actuator 1350 facilitates manufacture and installation, as the sets of engagement means (e.g., recesses 1356, 1366) ensure that the actuators 1350 are aligned in the correct direction when installed in the device 1200.

As can be seen in FIG. 14, the external configuration of the remote switch device 1200 is such that the device 1300, once assembled in a conventional switch plate 30, resembles other rocker switch devices in appearance. Further, the dimensions of the remote switch device 1200 permit the remote switch device-switch plate combination to be mounted on any surface, whether or not an electrical box is available. This versatility is realized in part by the low profile and arrangement of the circuit components on the circuit board 1380, which permit the depth of the enclosure 1213 to be reduced compared to enclosures in prior art wireless light switches.

Figure 19:
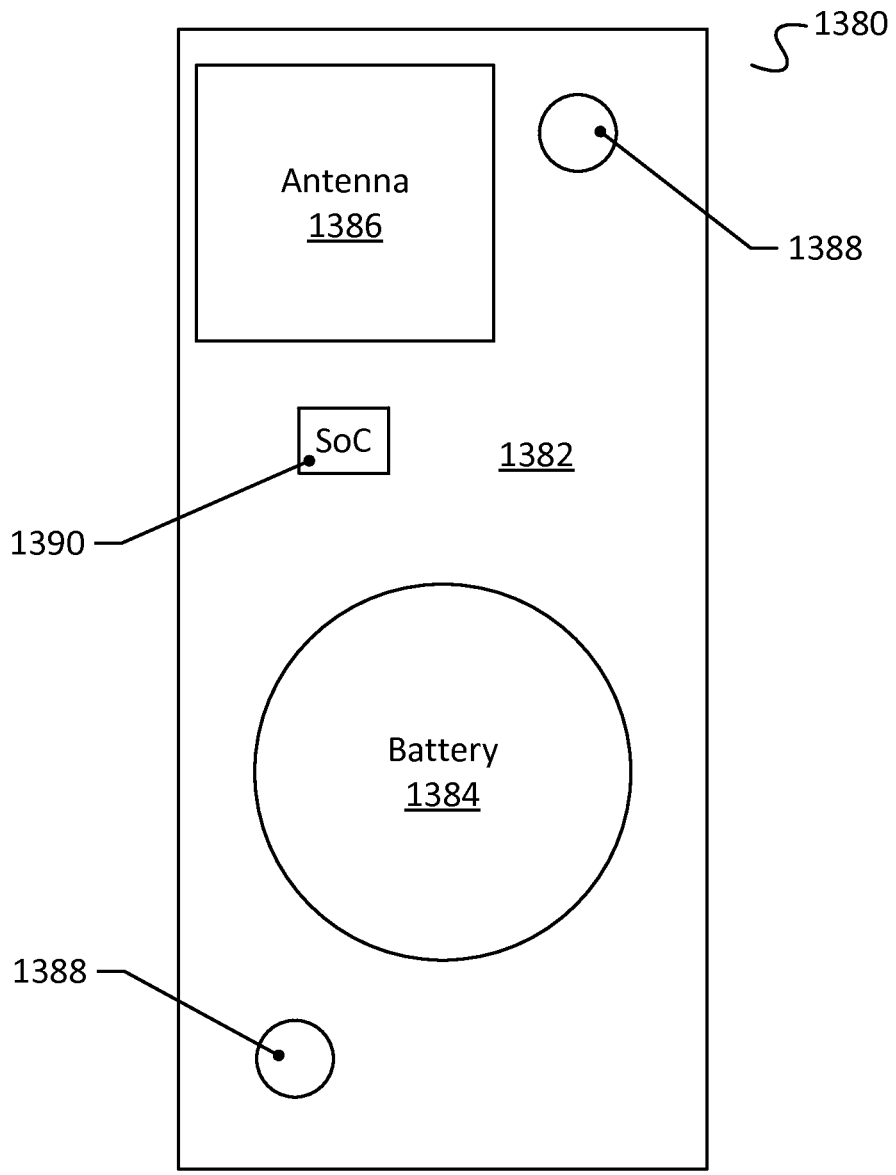
FIG. 19 is a schematic illustrating positioning of select circuit components of the remote switch device of FIG. 2 on a printed circuit board.

FIG. 19 is a schematic depicting the relative positions of major components of the remote switch device 1200, as they may be mounted on a printed circuit board. Switch contact traces 1388 are positioned proximate to the ends (i.e., the "top" and "bottom", when the remote switch device is mounted in a vertical or portrait orientation) of the circuit board 1380. At one end of the board 1380, proximate to one of the contact traces 1388, is a circuit board trace antenna 1386. The antenna may have any suitable configuration; as those skilled in the art appreciate, the design of the antenna is determined by factors such as available space and the intended transmission wavelength. The transceiver, processor, and memory of the remote switch device in this case is provided by a SoC 1390 positioned in a middle portion of the circuit board 1380. Occupying the most area on the circuit board is a lithium coin-type battery 1384, also located in the middle portion of the circuit board 1380. The battery 1384 is therefore retained in the enclosure 1213 substantially at or near the pivot axis of the rocker shell 1340, where the angle of the oblique walls 1241a, 1241b of the rocker shell 1240 protrudes towards the base 1210 of the remote switch device 1200. The battery 1384 is retained on the circuit board 1380 by a low profile holder 1392, indicated in FIG. 16, which comprises a retaining belt or pocket mounted at either side to the circuit board 1380 over a contact provided on the circuit board, such that the battery 1384 can be slid in and out of position on the contact. In one implementation, no surface-mounted components are provided near the ends of the board 1380, so the rear surfaces of the contact pads 1350 may rest flush against the circuit board.

The schematic of FIG. 19 omits other components that may be required for proper operation of the remote switch device 1200 such as resistors, capacitors, oscillators, and the like, as well as connecting traces; these additional components, however, generally occupy smaller volumes of space or circuit board area than the major components illustrated in FIG. 19. Overall, the total depth of the circuit board and components, together with the actuator 1350, fits within the dimensions of the enclosure 1213 given above. Thus, with appropriate selection and arrangement of circuit components, a remote switch device can be provided that permits flush wall-mounting using a commonly available Decora® brand or similar switch plate, without requiring the use of an electrical box or cutout in the wall to accommodate the remote switch components.

Figure 20:
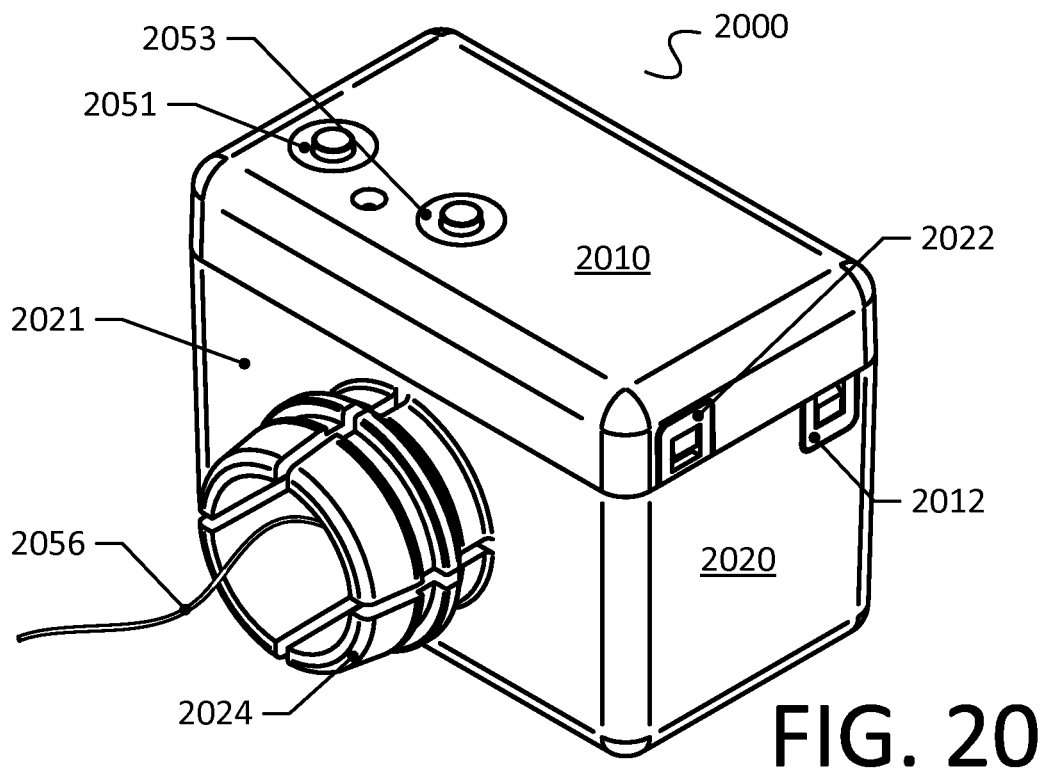
FIG. 20 is a front perspective view of an assembled load controller.

A companion load controller 2000 is illustrated in FIGS. 20 to 23. FIG. 20 is a perspective view of an assembled load controller 2000. The electrical components of the controller 2000 are contained in a an enclosure comprising, in this example, a lid 2010 and a base 2020, which may be manufactured from the same types of materials as the remote switch device 1200. In this example the lid 2010 is latched to the base 2020 by cooperating locking components 2012, 2022.

Figure 23:
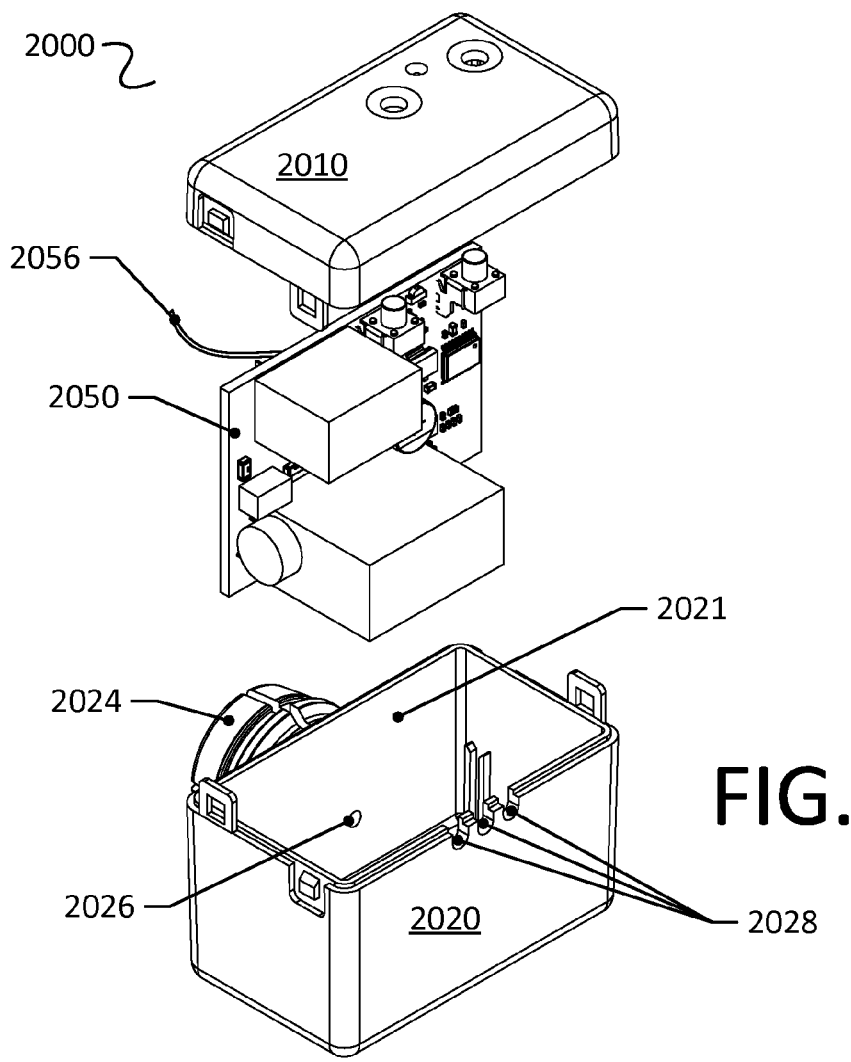
FIG. 23 is a rear perspective exploded view of the load controller of FIG. 20.

An antenna port 2026, visible in FIG. 23, is provided in a front wall 2021 of the load controller 2000. The antenna port 2026 position is selected to align with a junction box knockout when the load controller 2000 is installed in the junction box. To provide this alignment and maintain the load controller 2000 in fixed position once installed in the electrical box, a fitting 2024 such as a threaded nipple is provided on the wall 2021 of the load controller 2000, and the antenna port 2026 is positioned within the area defined by the fitting 2024. The fitting 2024 is sized to fit in the junction box knockout. As those skilled in the art will appreciate, knockouts of different dimensions may be provided in a junction box; the fitting 2024 may be sized to fit in any one of these dimensions. A wire or whip antenna 2056 extends from the interior of the enclosure, through the exit port 2026, to the exterior of the load controller. The enclosure also provides ports 2051, 2053 for one or more buttons or other user controls as well as ports 2028 (also shown in FIG. 23) for phase, neutral, and control wires for wiring to the light fixture. Excluding the fitting 2024 and protruding wires, the load controller 2000 in these examples has dimensions of approximately 55 mm long by 47 mm high by 39 mm deep.

Figure 21:
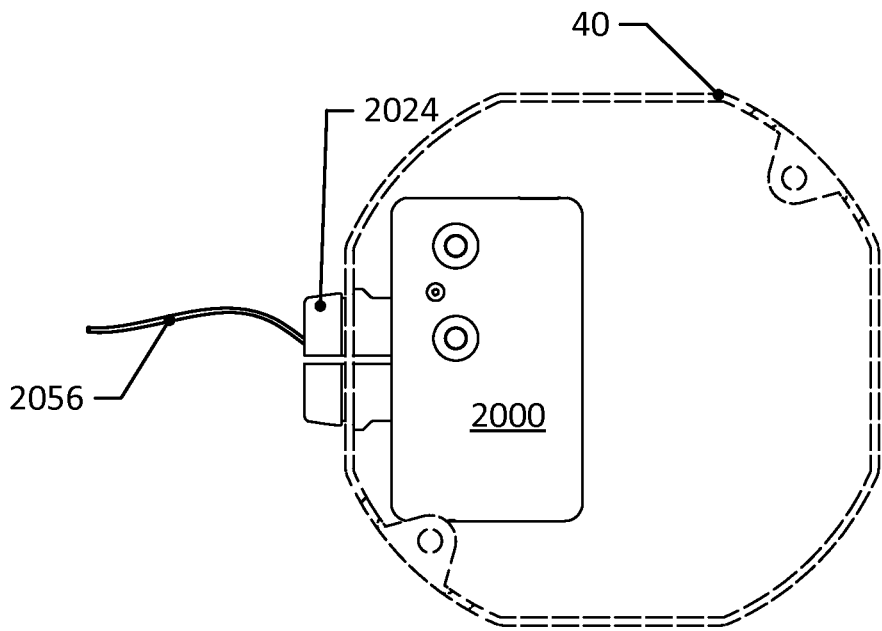
FIGS. 21 and 22 are top plan and side elevation views of the load controller of FIG. 20 as it may be positioned in a standard-sized octagon electrical box.
Figure 22:
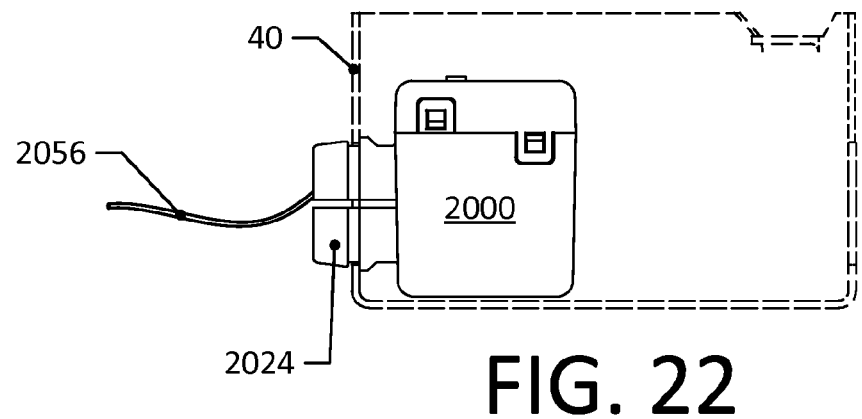

FIGS. 21 and 22 illustrate the load controller 2000 as it may be installed in a standard sized octagonal junction box 40. One standard size octagonal electrical box has dimensions of about 100 mm in length and depth by about 54 mm deep. It can be seen from the top and side views of these figures that the load controller 200 within the junction box 40, with more than half of the junction box's volume remaining to accommodate wires and connectors.

FIG. 23 depicts the load controller 200 in an exploded view. In this view, the ports 2028 for light fixture wiring (wires not shown in the figures) and the antenna port 2026 are visible in the base 2020. The fitting 2024 is mounted on the exterior of the front wall 2021. The position of the antenna port 2026 is coincident with the area surrounded by the fitting 2024.

Contained within the enclosure is a circuit board 2050 generally comprising the components described in connection with FIG. 3. The circuit board in this example sits vertically within the enclosure, with the bottom surface (i.e., opposite the surface on which circuit components are generally mounted) facing the front wall 2021. The antenna 2026 extends from the bottom surface of the circuit board 2050 through the antenna port 2026 and fitting 2024.

To install, once the load controller 2000 has been initialized, it is placed in the light fixture junction box 40 with the fitting 2024 and antenna 2056 extending through a knockout or other aperture in the junction box 40. The neutral and line wires leading off the controller 2000 are maretted (i.e., capped) with the corresponding building wiring, and the load wire from the controller 2000 is connected to the light fixture. It will be appreciated by those skilled in the art that because the antenna 2056 extends via the antenna port 2026 and fitting 2024 beyond the junction box 40, it will not be shielded by the junction box 40, even if the junction box is made of metal. Assuming that other materials in the surrounding area do not unduly attenuate or block signals to or from the antenna, there is no need to replace existing metal junction boxes 40 with plastic. This facilitates retrofitting of existing lighting fixtures, and permits the installer to use more durable metal rather than plastic junction boxes. The load controller 2000 can then be paired with one or more remote switch devices 120 as described above.

Throughout the specification, terms such as "may" and "can" are used interchangeably and use of any particular term should not be construed as limiting the scope or requiring experimentation to implement the claimed subject matter or embodiments described herein. Further, the various features and adaptations described in respect of one example or embodiment in this disclosure can be used with other examples or embodiments described herein, as would be understood by the person skilled in the art.

Code configured to provide the systems and methods described above may be provided on many different types of electronic device-readable media including physical or non-transitory data storage mechanisms (e.g., CD-ROM, RAM, flash memory, computer hard drive, etc.) that contain instructions for use in execution by a processor to perform the methods' operations and implement the systems described herein.

It should be understood that any processing or communication steps described herein may be altered, modified and/or augmented and still achieve the desired outcome. Various functional units may be implemented in hardware circuits such as custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method of managing operation of rewritable memory used to store a monotonically increasing sequence of multiple-byte binary values in a set of one or more memory locations in the rewritable memory, the method comprising:
reading in a first value from the set of one or more memory locations; on detection of an instruction to store an incremented value:
 permuting the incremented value by, in combination:
  applying an encoding, in which a value of a least significant bit changes only on every second increment, to two least significant bits of the incremented value; and
  on overflow of a least significant byte as a result of the increment, applying a cyclic byte-wise shift to the incremented value; and storing the permuted incremented value in the one or more memory locations.

2. The method of claim 1, wherein the encoding applied to the least significant two bits comprises an encoding of $a'_1 = a_1$ and $a'_0 = a_1 \otimes a_0$, wherein $a_0$ is an initial value of the least significant bit, $a'_0$ is an encoded value of the least significant bit, $a_1$ is an initial value of a second-least significant bit, and $a'_1$ is an encoded value of the second-least significant bit.

3. The method of claim 2, wherein the set of one or more memory locations comprises a plurality of memory locations, and the cyclic byte-wise shift comprises shifting a memory location allocated to a byte of the first value to a next byte of the incremented value.

4. The method of claim 1, wherein the rewritable memory comprises EEPROM.

5. A method of managing operation of rewritable memory used to store a sequence of binary values, the method comprising:
 defining an allocation of each one of a plurality of memory blocks in the rewritable memory to a corresponding byte position of a multiple-byte value;
 storing a first multiple-byte value in the memory blocks corresponding to the plurality of memory addresses according to the allocation;
 reading in the first value from the memory blocks; incrementing the first value to provide an incremented value;
 encoding two least significant bits of the incremented value according to the encoding of $a'_1 = a_1$ and $a'_0 = a_1 \otimes a_0$, wherein $a_0$ is an initial value of the least significant bit, $a'_0$ is an encoded value of the least significant bit, $a_1$ is an initial value of a second-least significant bit, and $a'_1$ is an encoded value of the second-least significant bit;
 when the incrementing of the first value does not result in an overflow of a least significant byte, storing the incremented value in the memory blocks according to the allocation;
 when the incrementing of the first value results in an overflow of a least significant byte, altering the allocation by cyclically shifting the allocation of the plurality of memory blocks to the corresponding byte positions, and storing the incremented value in the memory blocks according to the allocation as altered.

6. The method of claim 5, wherein storing the incremented value comprises rewriting only those memory blocks corresponding to bytes of the incremented value that are changed.

7. The method of claim 5, further comprising maintaining a mapping of the allocation of the plurality of memory blocks to the corresponding byte positions.

8. The method of claim 5, wherein the rewritable memory comprises EEPROM.

9. The method of claim 5, wherein the first value and the incremented value comprise values in a rolling code algorithm.

10. The method of claim 5, wherein only the least significant bit of the first value is incremented.

11. A method of managing operation of rewritable memory used to store an increment of a stored value, the stored value being represented by multiple bytes, the multiple bytes being stored in a defined set of blocks of the rewritable memory according to a defined byte order, the method comprising:
 detecting an instruction to store an incremented value in place of the stored value;
 permuting two least significant bits of the incremented value according to the encoding of $a'_1 = a_1$ and $a'_0 = a_1 \otimes a_0$, wherein $a_0$ is an initial value of the least significant bit, $a'_0$ is an encoded value of the least significant bit, $a_1$ is an initial value of a second-least significant bit, and $a'_1$ is an encoded value of the second-least significant bit;
 upon determining that the incremented value results in an overflow of a least significant byte as compared to the stored value, permuting the byte order according to a cyclic byte-wise shift, and storing the incremented value as incremented according to the permuted byte order.

12. An electronic device, comprising:
 a memory device comprising rewritable memory; and
 at least one processor,
 the memory device and the at least one processor being configured to implement a method comprising:
  reading in a first value from a set of one or more memory locations of the rewritable memory;
  on detection of an instruction to store an incremented value:
   permuting the incremented value by, in combination:
    applying an encoding, in which a value of a least significant bit changes only on every second increment, to two least significant bits of the incremented value; and
    on overflow of a least significant byte as a result of the increment, applying a cyclic byte-wise shift to the incremented value; and
   storing the permuted incremented value in the one or more memory locations.

13. The electronic device of claim 12, wherein the rewritable memory comprises EEPROM.

14. The electronic device of claim 12, wherein the first value and the incremented value comprise values in a rolling code algorithm.

15. The electronic device of claim 12, wherein the first value and the incremented value are comprised in a monotonically increasing sequence of multiple-byte binary values.

* * * * *